(12) United States Patent
Kaneko et al.

(10) Patent No.: US 7,779,673 B2
(45) Date of Patent: Aug. 24, 2010

(54) DEVICE AND METHOD FOR DETERMINING KNOCKING OF INTERNAL COMBUSTION ENGINE

(75) Inventors: Rihito Kaneko, Nishikamo-gun (JP); Kenji Kasashima, Nishikamo-gun (JP); Masatomo Yoshihara, Toyota (JP); Koji Aso, Susono (JP); Kenji Senda, Okazaki (JP); Yuichi Takemura, Anjo (JP); Shuhei Oe, Kariya (JP); Kiyoshi Iwade, Okazaki (JP)

(73) Assignees: Toyota Jidosha Kabushiki Kaisha, Toyota-shi (JP); Denso Corporation, Kariya-shi (JP); Nippon Soken, Inc., Nishio-shi (JP)

( * ) Notice: Subject to any disclaimer, the term of this patent is extended or adjusted under 35 U.S.C. 154(b) by 445 days.

(21) Appl. No.: 11/993,671

(22) PCT Filed: Dec. 27, 2006

(86) PCT No.: PCT/JP2006/326389

§ 371 (c)(1),
(2), (4) Date: Dec. 21, 2007

(87) PCT Pub. No.: WO2007/080815

PCT Pub. Date: Jul. 19, 2007

(65) Prior Publication Data

US 2010/0162794 A1 Jul. 1, 2010

(30) Foreign Application Priority Data

Jan. 10, 2006 (JP) .............................. 2006-002835

(51) Int. Cl.
*G01M 15/12* (2006.01)
(52) U.S. Cl. ................... 73/35.03; 73/35.06; 73/114.07

(58) Field of Classification Search ................. 73/35.01, 73/35.03, 35.04, 35.06, 114.02, 114.07
See application file for complete search history.

(56) References Cited

U.S. PATENT DOCUMENTS

| 7,263,430 | B2 * | 8/2007 | Kasashima et al. | .......... 701/111 |
| 2004/0260453 | A1 | 12/2004 | Sauler et al. | |
| 2006/0236753 | A1 * | 10/2006 | Yoshihara et al. | .......... 73/35.09 |
| 2006/0236754 | A1 * | 10/2006 | Oe et al. | .................... 73/35.09 |

(Continued)

FOREIGN PATENT DOCUMENTS

EP  1 586 882  10/2005

(Continued)

*Primary Examiner*—Eric S McCall
(74) *Attorney, Agent, or Firm*—Oblon, Spivak, McClelland, Maier & Neustadt, L.L.P.

(57) ABSTRACT

An engine ECU executes a program including the steps of: calculating an absolute value $\Delta S(I)$ of the deviation of the vibration waveform detected by a knock sensor and a knock waveform model from each other at each crank angle; when $\Delta S(I)$ greater than threshold value $\Delta S(0)$ is present and the number of $\Delta S(I)$ greater than threshold value $\Delta S(0)$ is equal to or smaller than $Q(1)$, correcting the vibration waveform; calculating a correlation coefficient K which is a value related to the deviation of the corrected vibration waveform and the knock waveform model from each other; and when the number of $\Delta S(I)$ greater than threshold value $\Delta S(0)$ is greater than predetermined number $Q(1)$, calculating the correlation coefficient K without correcting the vibration waveform. Based on the correlation coefficient K, whether knocking is present or absent is determined.

15 Claims, 18 Drawing Sheets

U.S. PATENT DOCUMENTS

2007/0000307 A1* 1/2007 Yoshihara et al. .......... 73/35.09
2008/0234918 A1* 9/2008 Kaneko et al. .............. 701/111

FOREIGN PATENT DOCUMENTS

| | | |
|---|---|---|
| JP | 4 76249 | 3/1992 |
| JP | 2003 21032 | 1/2003 |
| JP | 2004 353531 | 12/2004 |
| JP | 2005 23902 | 1/2005 |
| WO | 2005 103466 | 11/2005 |

* cited by examiner

F I G. 1
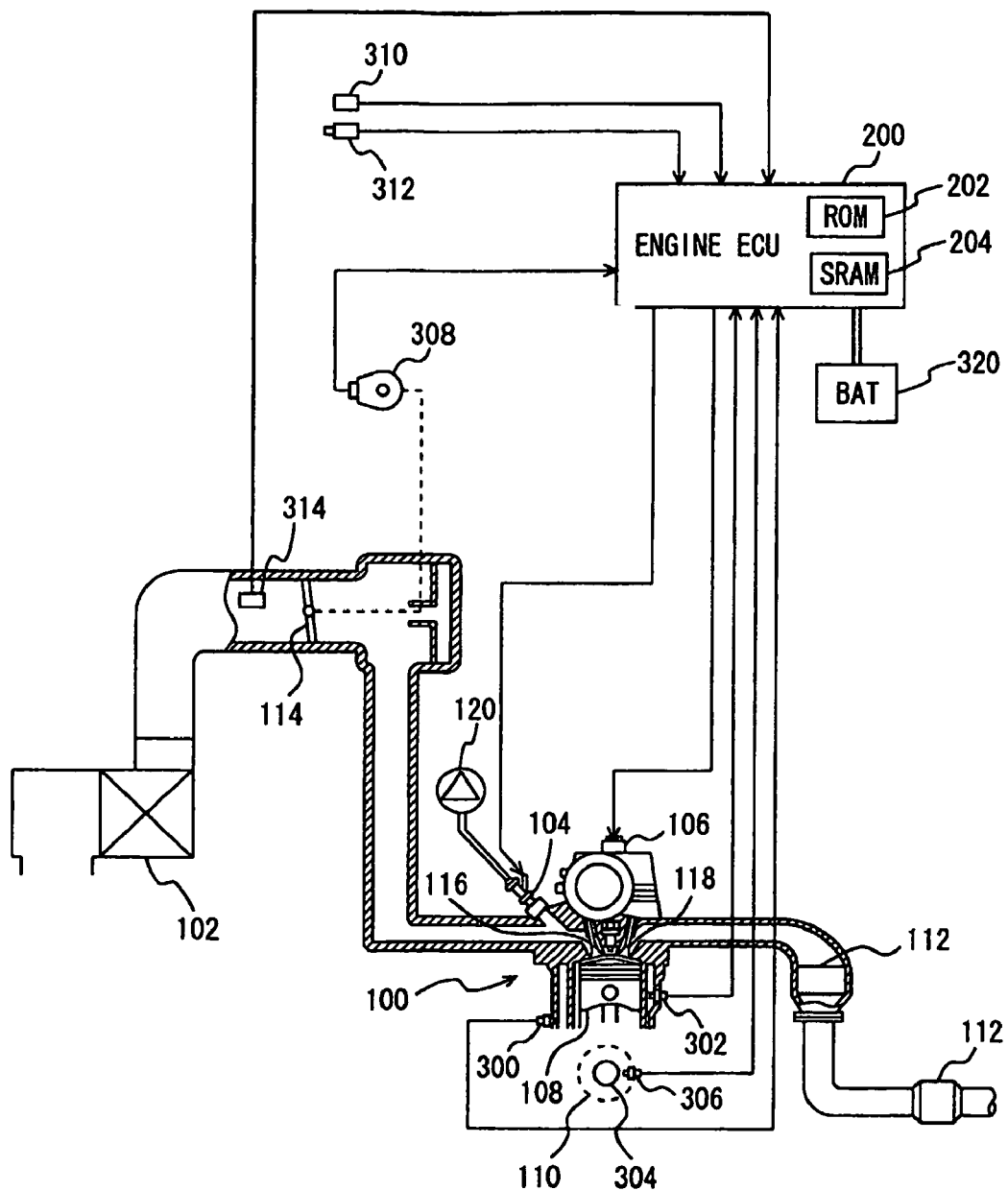

FIG. 7

|  | A | C | B |
|---|---|---|---|
| KL(2) |  |  |  |
| B | C | B |
| KL(1) |  |  |  |
| A | B | A |

INTAKE AIR AMOUNT KL

NE(1)　　NE(2)

ENGINE SPEED NE

F I G. 1 4
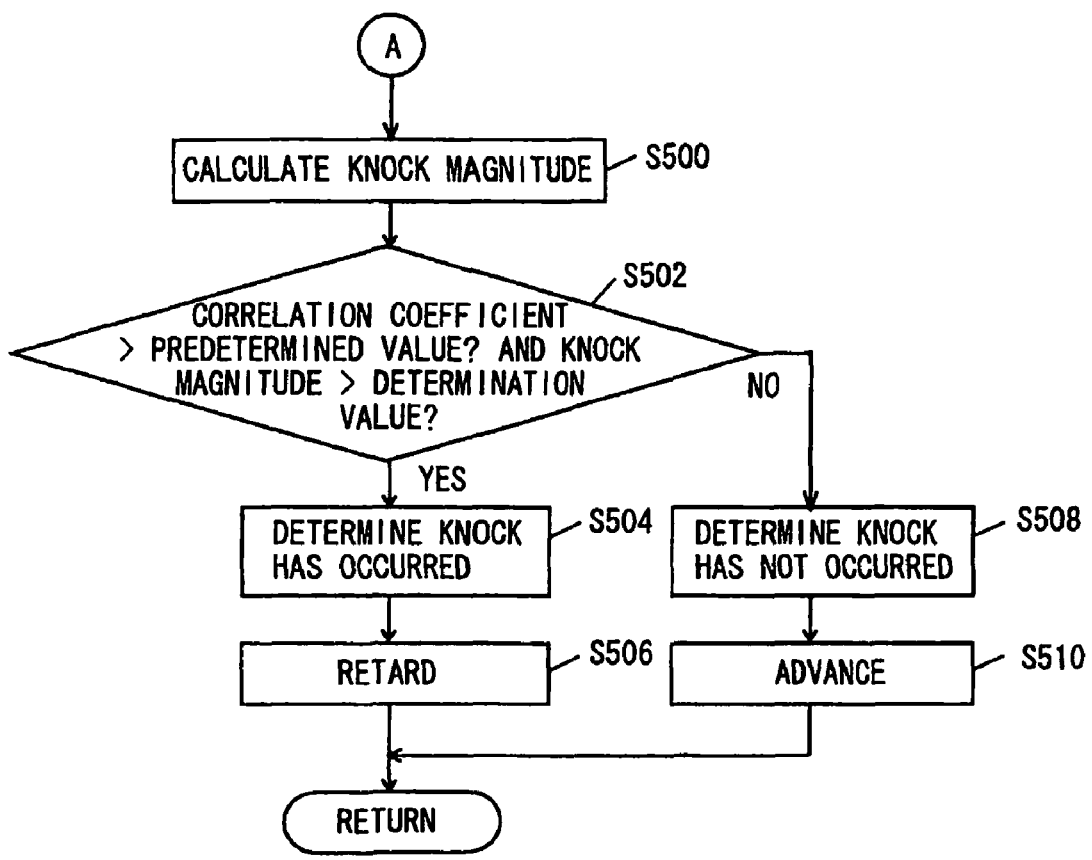

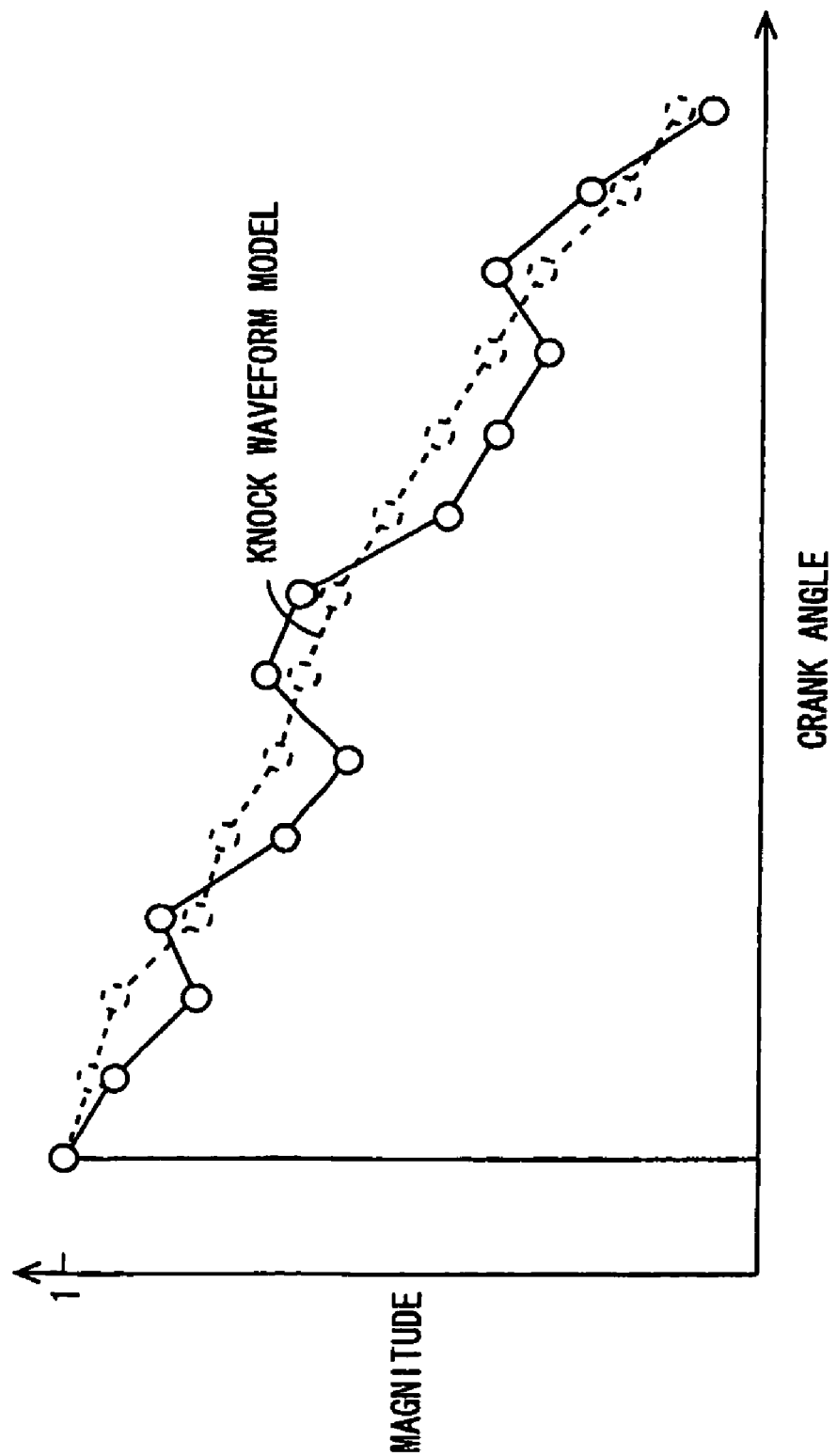

DEVICE AND METHOD FOR DETERMINING KNOCKING OF INTERNAL COMBUSTION ENGINE

TECHNICAL FIELD

The present invention relates to device and method for determining knocking of an internal combustion engine, and particularly to a technique of determining whether knocking is present or absent based on a waveform of vibration of an internal combustion engine.

BACKGROUND ART

Conventionally, various methods of determining whether knocking (knock) is present or absent have been proposed. For example, there is a technique of determining occurrence of knocking based on whether or not magnitude of vibration detected in an internal combustion engine is greater than a knocking determination value. A knock control device for an internal combustion engine disclosed in Japanese Patent Laying-Open No. 2003-021032 includes: a knock sensor detecting knocking in an internal combustion engine; a statistical processing portion statistically processing an output signal detected by the knock sensor; a first temporal determination portion determining occurrence of knocking based on a processing result by the statistical processing portion; a second temporal determination portion determining occurrence of knocking based on a waveform shape of the output signal detected by the knock sensor; and a final determination portion finally determining occurrence of knocking based on the knock temporal determination of the first temporal determination portion and the knock temporal determination of the second temporal determination portion. When both of the first and second temporal determination portions determine that knocking has occurred, the final determination portion finally determines that knocking has occurred.

According to the knock control device disclosed by the publication, a knock temporal determination by a statistical processing program and a knock temporal determination by a waveform shape program are used, and only when both of the temporal determinations determine that knocking has occurred, it is finally determined that knocking has occurred. As a result, occurrence of knocking can precisely be determined even as to an output signal, which has been erroneously determined by a knock determination employing solely the statistical processing program or the waveform shape program.

Meanwhile, in an internal combustion engine, besides vibration due to knocking, vibration may occur when an intake valve or an exhaust valve sits on its seat. Vibration may also occur due to the actuation of an injector (in particular, an in-cylinder direct injector that directly injects fuel inside a cylinder) or a high-pressure pump that supplies fuel to the injector. When such vibration is detected as noise together with vibration due to knocking, the detected waveform is different from that at the time of knocking, even though knocking has occurred. In this case, if whether knocking is present or absent is determined based on the waveform shape as in the knock control device disclosed in Japanese Patent Laying-Open No. 2003-021032, it may erroneously be determined that knocking has not occurred, even though knocking has occurred.

DISCLOSURE OF THE INVENTION

An object of the present invention is to provide a device and the like for determining knocking of an internal combustion engine that can precisely determine whether knocking is present or absent.

A device for determining knocking of an internal combustion engine according to the present invention includes: a crank position sensor detecting a crank angle of the internal combustion engine; a knock sensor detecting magnitude of vibration of the internal combustion engine to correspond to the crank angle; and an operation unit connected to the crank position sensor and the knock sensor. The operation unit detects a waveform of vibration in a predetermined interval of the crank angle based on the magnitude of vibration of the internal combustion engine. The operation unit calculates for each predetermined crank angle a difference in magnitude of vibration between the detected waveform and a waveform model predetermined as a reference waveform of vibration of the internal combustion engine. When a difference in magnitude greater than a predetermined value is present and number of the difference in magnitude greater than the predetermined value is equal to or smaller than a predetermined number, the operation unit corrects the detected waveform. When the difference in magnitude greater than the predetermined value is present and the number of the difference in magnitude greater than the predetermined value is equal to or smaller than the predetermined number, the operation unit determines whether or not knocking has occurred in the internal combustion engine based on a result of comparison between the corrected waveform and the waveform model. When the difference in magnitude greater than the predetermined value is present and the number of the difference in magnitude greater than the predetermined value is greater than the predetermined number, the operation unit determines whether or not knocking has occurred in the internal combustion engine based on a result of comparison between the detected waveform and the waveform model.

According to the present invention, magnitude of vibration of the internal combustion engine is detected to correspond to the crank angle. Based on the magnitude of vibration, a waveform of vibration in a predetermined interval of the crank angle is detected. When knocking occurs, this waveform is in a shape specific to knocking. Accordingly, for example, using a waveform model formed as a waveform of vibration associated with occurrence of knocking as the reference and comparing the waveform model with the obtained waveform, whether knocking is present or absent can be determined. However, in an internal combustion engine, besides vibration due to knocking, vibration that is great and short (shorter in an occurrence period than the vibration due to knocking) may occur due to an intake valve or an exhaust valve sitting on its seat. Vibration that is great and short (shorter in an occurrence period than the vibration due to knocking) may also occur due to the actuation of an injector (in particular, an in-cylinder direct injector that directly injects fuel inside a cylinder) or a high-pressure pump that supplies fuel to the injector. When such vibration is detected as noise together with vibration due to knocking, the detected waveform is different from that at the time of knocking, even though knocking has occurred. When determination as to presence or absence of knocking is made using a waveform including noise, it may erroneously be determined that knocking has not occurred because of the different waveform, even though knocking has occurred. Then, in order to determine the presence or absence of noise, a difference in magnitude of vibration between the detected waveform and the waveform model is calculated for each predetermined crank angle. If a difference in magnitude greater than a predetermined value is present and the number of the difference in magnitude greater than the predetermined value is equal to or smaller than a predetermined number, then vibration that is great and short, i.e., noise may be included. In this case, the detected waveform is corrected. Based on the comparison between the corrected waveform and the waveform model, whether or not knocking has occurred in the internal combustion engine is determined. Accordingly, an erroneous determination that knocking has not occurred even though knocking has occurred because of the different waveform can be suppressed. On the other hand, if the difference in magnitude greater than the predetermined value is present and the number of the difference in magnitude greater than the predetermined value is greater than the predetermined number, then vibration that is great but not short, i.e., vibration not due to noise may be included. In this case, without correcting the waveform, based on the result of comparison between the detected waveform and the waveform model, whether or not knocking has occurred in the internal combustion engine is determined. Thus, an erroneous determination that knocking has occurred even though knocking has not occurred, which is invited by undue correction of the waveform, can be suppressed. As a result, a device for determining knocking of an internal combustion engine that can precisely determine whether knocking is present or absent can be provided.

Preferably, the operation unit corrects the detected waveform so that at least one of the differences in magnitude greater than the predetermined value is reduced.

According to the present invention, the detected waveform is corrected so that at least one of the differences in magnitude greater than the predetermined value is reduced. Accordingly, the effect of noise included in the waveform can be suppressed. Thus corrected waveform and the waveform model are compared with each other to determine whether or not knocking has occurred. As a result, an erroneous determination that knocking has not occurred even though knocking has occurred can be suppressed.

Further preferably, the operation unit corrects the detected waveform so that, in the differences in magnitude greater than the predetermined value, a difference in magnitude that is smaller in number than the differences in magnitude greater than the predetermined value is reduced.

According to the present invention, the detected waveform is corrected so that, in the differences in magnitude greater than the predetermined value, part of the differences in magnitude is reduced. Thus, undue correction of the waveform can be suppressed in a case where vibration great in magnitude and short is included but it may not be attributed to noise. As a result, an erroneous determination that knocking has occurred even though knocking has not occurred can be suppressed.

Still further preferably, the operation unit further selects based on the difference in magnitude a crank angle at which the difference in magnitude is to be reduced, out of crank angles at which the difference in magnitude is greater than the predetermined value, and corrects the detected waveform so that, in the differences in magnitude greater than the predetermined value, a difference in magnitude at the selected crank angle is reduced.

According to the present invention, the waveform is corrected so that, in the differences in magnitude greater than the predetermined value, a difference in magnitude at the crank angle selected based on the difference in magnitude is reduced. Thus, for example at a crank angle where the detected waveform and the waveform model are greatly different from each other, the detected waveform can be corrected. Thus, the effect of noise can effectively be suppressed. Accordingly, an erroneous determination that knocking has not occurred even though knocking has occurred can be suppressed. Furthermore, at a crank angle where the difference between the detected waveform and the waveform model are small, the detected waveform can be corrected. Thus, the effect of the correction can be prevented from becoming unduly great. As a result, an erroneous determination that knocking has occurred even though knocking has not occurred can be suppressed.

Still further preferably, the operation unit selects the crank angle placing higher priority on a crank angle at which the difference in magnitude is greater.

According to the present invention, the waveform is corrected so that, in the differences in magnitude greater than the predetermined value, a difference in magnitude at a crank angle where the difference in magnitude is greater is reduced. Thus, the detected waveform can be corrected at the crank angle where the detected waveform and the waveform model are greatly different from each other. Therefore, the effect due to noise can effectively be suppressed. As a result, an erroneous determination that knocking has not occurred even though knocking has occurred can be suppressed.

BRIEF DESCRIPTION OF THE DRAWINGS

FIG. 1 is a schematic configuration diagram of an engine controlled by an engine ECU which is a knocking determination device according to a first embodiment of the present invention;

FIG. 7 is a chart showing a map of a determination value V(KX) stored in the ROM or SRAM of the engine ECU;

FIG. 14 is a flowchart (No. 2) showing the control structure of the program executed by the engine ECU which is the knocking determination device according to the first embodiment of the present invention;

FIG. 15 is a chart (No. 2) for comparing the vibration waveform with the knock waveform model;

BEST MODES FOR CARRYING OUT THE INVENTION

Figure 2:
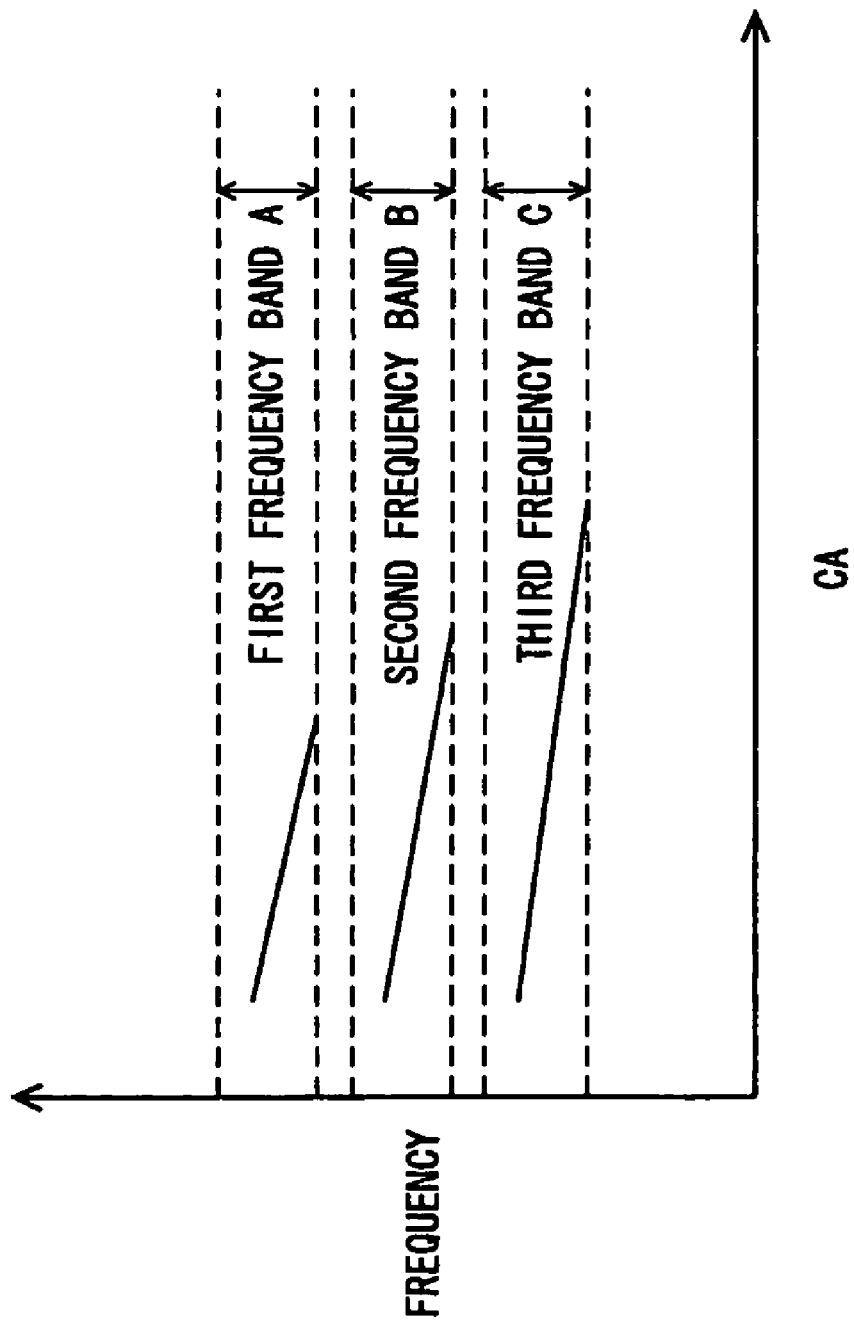
FIG. 2 is a chart showing a frequency band of vibration generated in the engine at the time of knocking.

Embodiments of the present invention will be described below with reference to the drawings. In the following description, the same parts are provided with the same reference numerals. They have the same names and functions. Therefore, detailed description of the same parts is not repeated.

With reference to FIG. 1, an engine 100 of a vehicle mounted with a knocking determination device according to the embodiment of the present invention will be described. The knocking determination device according to the present invention is accomplished by a program executed by an engine ECU (Electronic Control Unit) 200, for example.

Engine 100 is an internal combustion engine in which an air-fuel mixture of air drawn in from an air cleaner 102 and fuel injected from an injector 104 is ignited by a spark plug 106 and burnt in a combustion chamber. An ignition timing is controlled to be MBT (Minimum advance for Best Torque) at which output torque becomes the maximum but is retarded or advanced according to an operation state of engine 100 such as occurrence of knocking.

When the air-fuel mixture is burnt, a piston 108 is pushed down by combustion pressure and a crankshaft 110 is rotated. The air-fuel mixture after combustion (exhaust gas) is cleaned by three-way catalysts 112 and exhausted outside a car. An amount of air amount drawn into engine 100 is regulated by a throttle valve 114.

Engine 100 is controlled by engine ECU 200. Connected to engine ECU 200 are a knock sensor 300, a water temperature sensor 302, a crank position sensor 306 provided to face a timing rotor 304, a sensor 308 of an opening position of throttle, a vehicle speed sensor 310, an ignition switch 312, and an air flow meter 314.

Knock sensor 300 is provided to a cylinder block of engine 100. Knock sensor 300 is formed of a piezoelectric element. Knock sensor 300 generates voltage in response to vibration of engine 100. Magnitude of the voltage corresponds to magnitude of the vibration. Knock sensor 300 sends a signal representing voltage to engine ECU 200. Water temperature sensor 302 detects temperature of cooling water in a water jacket of engine 100 and sends a signal representing a detection result to engine ECU 200.

Timing rotor 304 is provided to crankshaft 110 and rotates with crankshaft 110. On an outer periphery of timing rotor 304, a plurality of protrusions are provided at predetermined intervals. Crank position sensor 306 is provided to face the protrusions of the timing rotor 304. When timing rotor 304 rotates, an air gap between the protrusion of timing rotor 304 and crank position sensor 306 changes and, as a result, magnetic flux passing through a coil portion of crank position sensor 306 increases and decreases to generate electromotive force in the coil portion. Crank position sensor 306 sends a signal representing the electromotive force to engine ECU 200. Engine ECU 200 detects a crank angle and the number of rotations of crankshaft 110 based on the signal sent from crank position sensor 306.

Sensor 308 of the opening position of throttle detects an opening position of throttle and sends a signal representing a detection result to engine ECU 200. Vehicle speed sensor 310 detects the number of rotations of a wheel (not shown) and sends a signal representing a detection result to engine ECU 200. Engine ECU 200 calculates a vehicle speed based on the number of rotations of the wheel. Ignition switch 312 is turned on by a driver in starting of engine 100. Air flow meter 314 detects the intake air amount into engine 100 and sends a signal representing a detection result to engine ECU 200.

Engine ECU 200 operates by electric power supplied from an auxiliary battery 320 that is a power supply. Engine ECU 200 performs computation based on signals sent from the respective sensors and ignition switch 312 and map and program stored in ROM (Read Only Memory) 202 or SRAM (Static Random Access Memory) 204 and controls the devices so as to bring engine 100 into a desired operation state.

In the present embodiment, engine ECU 200 detects a waveform of vibration (hereafter referred to as "vibration waveform") of engine 100 in a predetermined knock detection gate (a section between a predetermined first crank angle and a predetermined second crank angle) based on the signal and the crank angle sent from knock sensor 300 and determines whether or not knocking has occurred in engine 100 based on the detected vibration waveform. The knock detection gate in the embodiment is from a top dead center (0°) to 90° in a combustion stroke. The knock detection gate is not limited to it.

When knocking occurs, vibration at a frequency near a frequency shown in a solid line in FIG. 2 is generated in engine 100. The frequency of the vibration generated due to the knocking is not constant and varies in a certain range of frequencies. Therefore, in the embodiment, as shown in FIG. 2, vibrations included in a first frequency band A, a second frequency band B, and a third frequency band C, are detected. In FIG. 2, CA designates the crank angle. The number of frequency bands of vibrations generated due to the knocking is not restricted to three.

Figure 3:
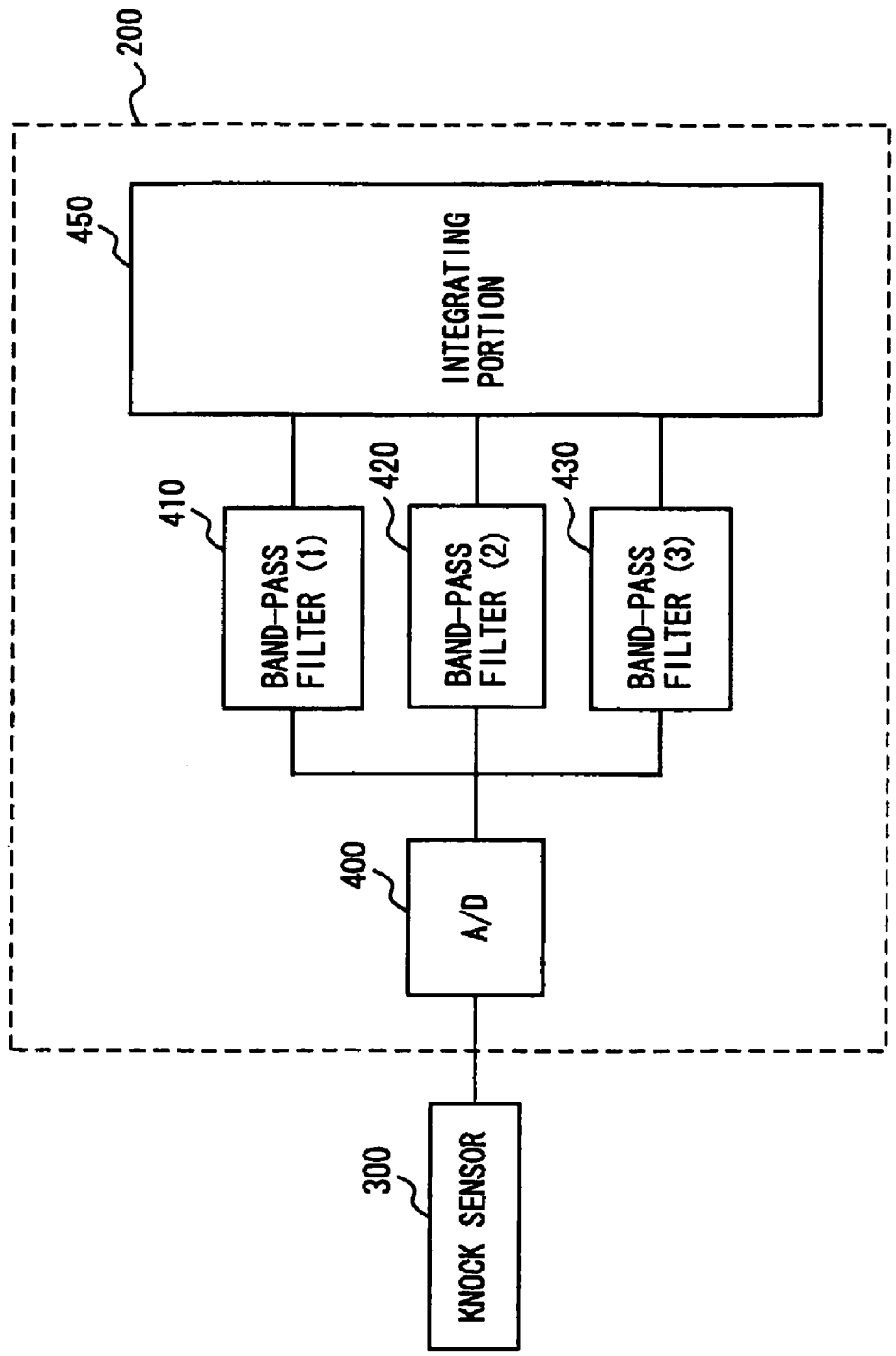
FIG. 3 is a control block diagram showing the engine ECU in FIG. 1.

With reference to FIG. 3, engine ECU 200 will be further described. Engine ECU 200 includes an A/D (analog/digital) converter 400, a band-pass filter (1) 410, a band-pass filter (2) 420, a band-pass filter (3) 430, and an integrating portion 450.

A/D converter 400 converts an analog signal sent from knock sensor 300 into a digital signal. Band-pass filter (1) 410 allows passage of only signals in first frequency band A out of signals sent from knock sensor 300. In other words, by band-pass filter (1) 410, only vibrations in first frequency band A are extracted from vibrations detected by knock sensor 300.

Band-pass filter (2) 420 allows passage of only signals in second frequency band B out of signals sent from knock sensor 300. In other words, by band-pass filter (2) 420, only vibrations in second frequency band B are extracted from vibrations detected by knock sensor 300.

Band-pass filter (3) 430 allows passage of only signals in third frequency band C out of signals sent from knock sensor 300. In other words, by band-pass filter (3) 430, only vibrations in third frequency band C are extracted from vibrations detected by knock sensor 300.

Integrating portion 450 integrates signals selected by the band-pass filters (1) 410 to (3) 430, i.e., magnitudes of vibrations for a crank angle of 5° at a time. The integrated value will hereafter be referred to as an integrated value. The integrated value is calculated in each frequency band. By this calculation of the integrated value, the vibration waveform in each frequency band is detected.

Furthermore, the calculated integrated values in the first to third frequency bands A to C are added to correspond to the crank angles. In other words, the vibration waveforms of the first to third frequency bands A to C are synthesized.

Figure 4:
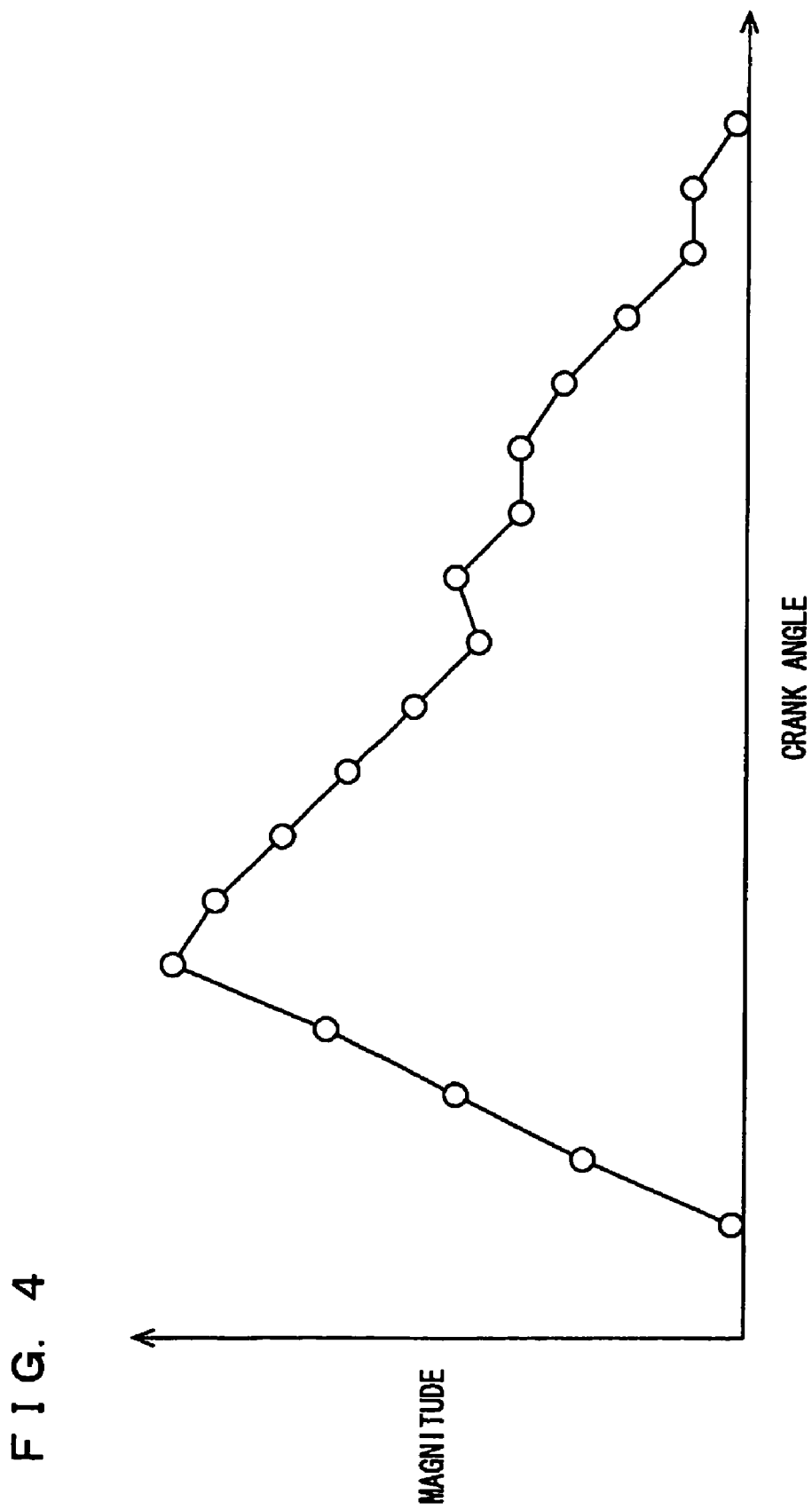
FIG. 4 is a chart showing a waveform of vibration in the engine.

As a result, as shown in FIG. 4, a vibration waveform of engine 100 is detected. In other words, the synthesized waveform of the first to third frequency bands A to C are used as the vibration waveform of engine 100.

Figure 5:
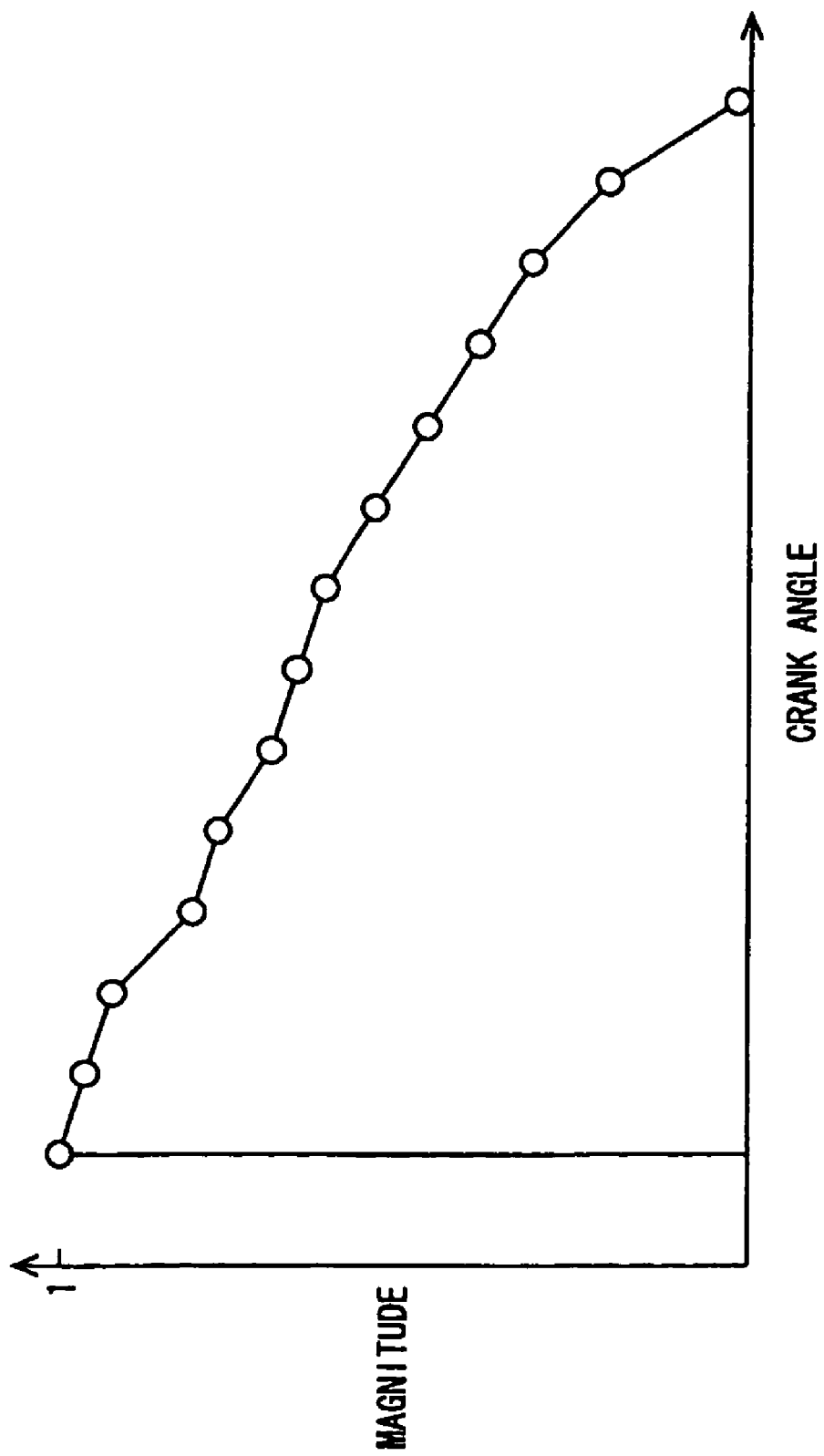
FIG. 5 is a chart showing a knock waveform model stored in ROM of the engine ECU.

The detected vibration waveform is compared with a knock waveform model stored in ROM 202 of engine ECU 200 as shown in FIG. 5. The knock waveform model is formed in advance as a model of a vibration waveform when the knocking occurs in engine 100.

In the knock waveform model, the magnitudes of the vibrations are expressed as dimensionless numbers in a range of 0 to 1 and the magnitude of the vibration does not univocally correspond to the crank angle. In other words, in the knock waveform model in the embodiment, it is determined that the magnitude of the vibration decreases as the crank angle increases after a peak value of the magnitude of the vibration, but a crank angle at which the magnitude of the vibration becomes the peak value is not determined.

The knock waveform model in the embodiment corresponds to the vibration after the peak value of the magnitude of the vibration generated due to the knocking. It is also possible to store a knock waveform model corresponding to vibration after a rising edge of the vibration caused by the knocking.

The knock waveform model is formed and stored in advance based on a vibration waveform of engine 100 detected when knocking is forcibly generated experimentally.

The knock waveform model is formed by using engine 100 with dimensions of engine 100 and an output value of knock sensor 300 which are median values of dimensional tolerance and tolerance of the output value of knock sensor 300 (hereafter referred to as "median characteristic engine"). In other words, the knock waveform model is a vibration waveform in a case in which the knocking is forcibly generated in the median characteristic engine. A method of forming the knock waveform model is not limited to it and it is also possible to form the model by simulation.

Figure 6:
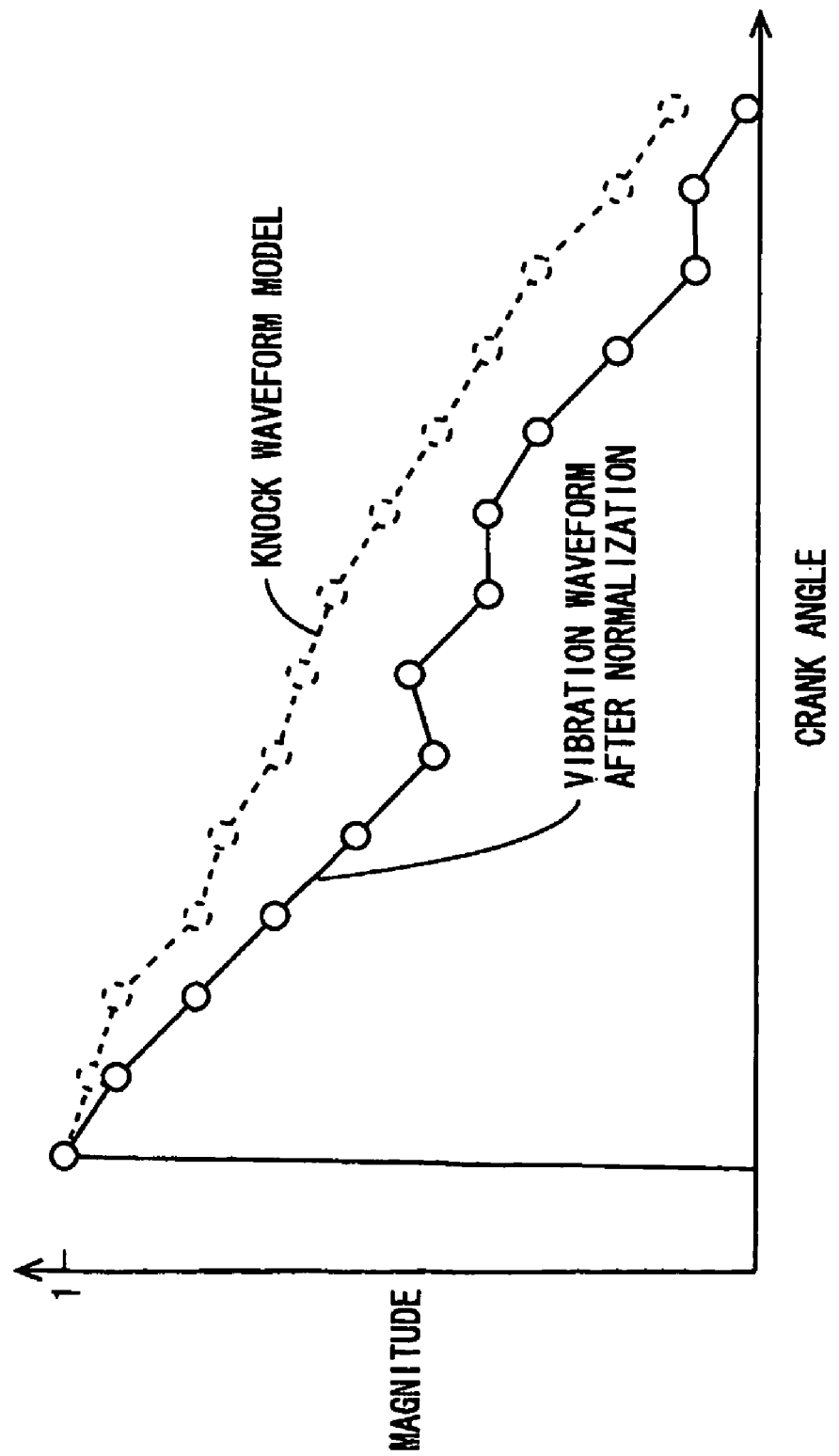
FIG. 6 is a chart (No. 1) for comparing the vibration waveform with the knock waveform model.

In comparison between the detected waveform and the knock waveform model, as shown in FIG. 6, a normalized waveform and the knock waveform model are compared with each other. Here, normalization means to express the magnitude of the vibration as a dimensionless number in a range of 0 to 1 by dividing each integrated value by a maximum value of the integrated value in the detected vibration waveform, for example. However, a method of normalization is not limited to it.

In the embodiment, engine ECU 200 calculates a correlation coefficient K which is a value related to a deviation of the normalized vibration waveform and the knock waveform model from each other. With timing at which the magnitude of the vibration becomes a maximum value in the vibration waveform after the normalization and timing at which the magnitude of the vibration becomes a maximum value in the knock waveform model synchronized, an absolute value (deviation amount) of the deviation of the vibration waveform after the normalization and the knock waveform model from each other is calculated at each crank angle (at every 5° of crank angle) to thereby calculate correlation coefficient K.

If the absolute value of the deviation of the vibration waveform after the normalization and the knock waveform model from each other at each crank angle is $\Delta S(I)$ (I is a natural number) and a value (an area of the knock waveform model) obtained by integrating the magnitude of vibration in the knock waveform model by the crank angle is S, correlation coefficient K is calculated by an equation, $K=(S-\Sigma \Delta S(I))/S$, where $\Sigma \Delta S(I)$ is the total of $\Delta S(I)$. In the embodiment, the closer a shape of the vibration waveform to a shape of the knock waveform model, the greater value. correlation coefficient K is calculated as. Therefore, if a waveform of vibration caused by factors other than the knocking is included in the vibration waveform, correlation coefficient K is calculated as a small value. A method of calculating correlation coefficient K is not limited to it.

Furthermore, engine ECU 200 calculates a knock magnitude N based on the maximum value (peak value) of the integrated values. If the maximum integrated value is P and a value representing the magnitude of vibration of engine 100 where knocking does not occur is BGL (Back Ground Level), knock magnitude N is calculated by an equation, N=P/BGL. It is noted that maximum integrated value P used in calculating knock magnitude N is logarithmically converted. A method of calculating knock magnitude N is not limited to it.

BGL is calculated as a value obtained by subtracting the product of a standard deviation a and a coefficient (for example "1") from a median value V(50) in the frequency distribution of magnitude values LOG(V), which will be described later. A method of calculating BGL is not limited to it, and BGL may also be stored in ROM 202 in advance.

In the embodiment, engine ECU 200 compares calculated knock magnitude N and a determination value V(KX) stored in SRAM 204 with each other, and further compares the detected waveform and the stored knock waveform model with each other. Then engine ECU 200 determines whether or not knocking has occurred in engine 100 for every ignition cycle.

As shown in FIG. 7, determination values V(KX) are stored as a map for each range divided by an operation state using an engine speed NE and an intake air amount KL as parameters. In the embodiment, nine ranges for each cylinder are provided, which are divided as follows: low speed (NE<NE(1)); medium speed (NE(1)≦NE<NE(2)); high speed (NE(2)≦NE); low load (KL<KL(1)); medium load (KL(1)≦KL<KL(2)); and high load (KL(2)≦KL). The number of the ranges is not limited to it. The ranges may be divided using parameters other than engine speed NE and intake air amount KL.

At the time of shipment of engine 100 or the vehicle, a value determined in advance by an experiment or the like is used as determination value V(KX) stored in ROM 202 (an initial value of determination value V(KX) at the time of shipment). However, a magnitude of the same vibration occurring in engine 100 may be detected as different values due to variation in the output values and degradation of knock sensor 300. In this case, it is necessary to correct determination value V(KX) and to determine whether or not knocking has occurred by using determination value V(KX) corresponding to the magnitude detected actually.

Therefore, in the embodiment, a knock determination level V(KD) is calculated based on frequency distribution representing a relationship between a magnitude value LOG(V) which is a value obtained by logarithmically converting magnitudes V and a frequency (the number of times, a probability) of detection of each magnitude value LOG(V).

Magnitude value LOG(V) is calculated for each range in which engine speed NE and intake air amount KL are used as parameters. Magnitude V used for calculating magnitude value LOG(V) is a peak value (peak value of integrated values at every5°) of magnitudes between predetermined crank angles. Based on calculated magnitude value LOG(V), median value V(50) at which the accumulative sum of frequencies of magnitudes LOG(V) from the minimum value reaches 50% is calculated. Furthermore, a standard deviation σ of magnitude values LOG(V) equal to or smaller than median value V(50) is calculated. For example, in the embodiment, a median value V(50) and a standard deviation σ, which approximate the median value and standard deviation calculated based on a plurality of magnitude values LOG(V) (e.g., 200 cycles), are calculated for each ignition cycle by the following calculation method.

If a currently detected magnitude value LOG(V) is greater than a previously calculated median value V(50), then a value obtained by adding a predetermined value C(1) to the previously calculated median value V(50) is calculated as a current median value V(50). On the other hand, if a currently detected magnitude value LOG(V) is smaller than a previously calculated median value V(50), then a value obtained by subtracting a predetermined value C(2) (e.g., C(2) and C(1) are the same value) from the previously calculated median value V(50) is calculated as a current median value V(50).

If a currently detected magnitude value LOG(V) is smaller than a previously calculated median value V(50) and greater than a value obtained by subtracting a previously calculated standard deviation a from the previously calculated median value V(50), then a value obtained by subtracting a value twice as large as a predetermined value C(3) from the previously calculated standard deviation a is calculated as a current standard deviation σ. On the other hand, if a currently detected magnitude value LOG(V) is greater than a previously calculated median value V(50) or smaller than a value obtained by subtracting a previously calculated standard deviation σ from the previously calculated median value V(50), then a value obtained by adding a predetermined value C(4) (e.g., C(3) and C(4) are the same value) to the previously calculated standard deviation a is calculated as a current standard deviation σ. A method of calculating median value V(50) and standard deviation a is not limited to it. Also, initial values of median value V(50) and standard deviation a may be values set in advance or may be "0".

Figure 8:
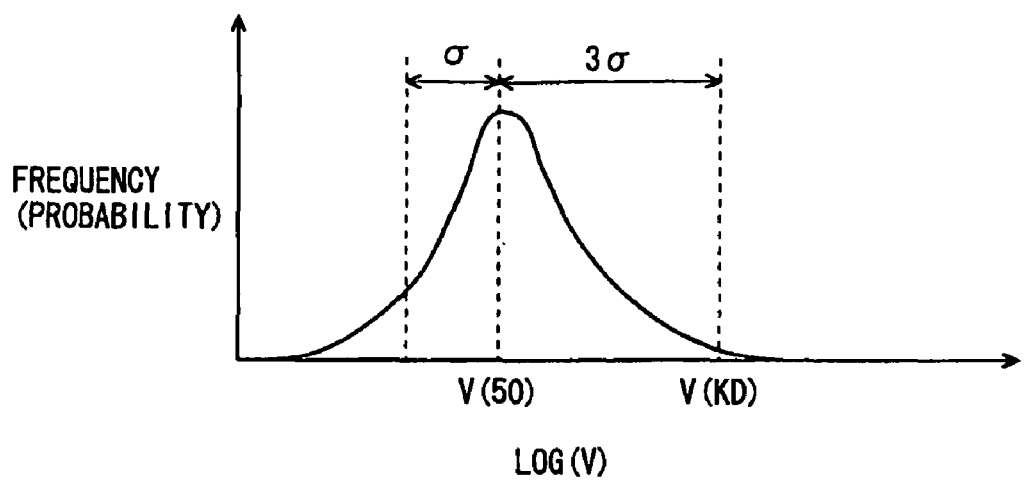
FIG. 8 is a chart (No. 1) showing frequency distribution of magnitude values LOG(V)

Using median value V(50) and standard deviation σ, a knock determination level V(KD) is calculated. As shown in FIG. 8, a value obtained by adding the product of a coefficient U(1) (U(1) is a constant and U(1)=3, for example) and standard deviation σ to median value V(50) is a knock determination level V(KD). A method of calculating knock determination level V(KD) is not limited to it.

Proportion (frequency) of magnitude values LOG(V) greater than knock determination level V(KD) is determined as a frequency of occurrence of knocking, and counted as knock proportion KC. If knock proportion KC is greater than a threshold value KC(0), then determination value V(KX) is corrected to be reduced by a predetermined correction amount so that the frequency of retarding ignition timing becomes higher. If knock proportion KC is smaller than threshold value KC(0), then determination value V(KX) is corrected to be increased by a predetermined correction amount so that the frequency of advancing ignition timing becomes higher.

Coefficient U(1) is a coefficient obtained based on data and findings obtained by experiments and the like. Magnitude value LOG(V) greater than knock determination level V(KD) when U(1)=3 substantially agrees with magnitude value LOG(V) in an ignition cycle in which knocking has actually occurred. It is also possible to use other values than "3" as coefficient U(1).

Figure 9:
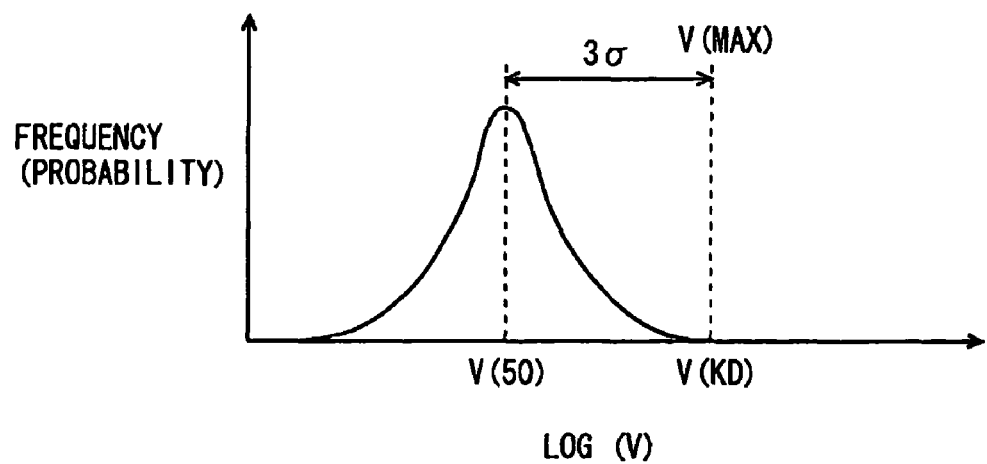
FIG. 9 is a chart (No. 2) showing frequency distribution of magnitude values LOG(V)
Figure 10:
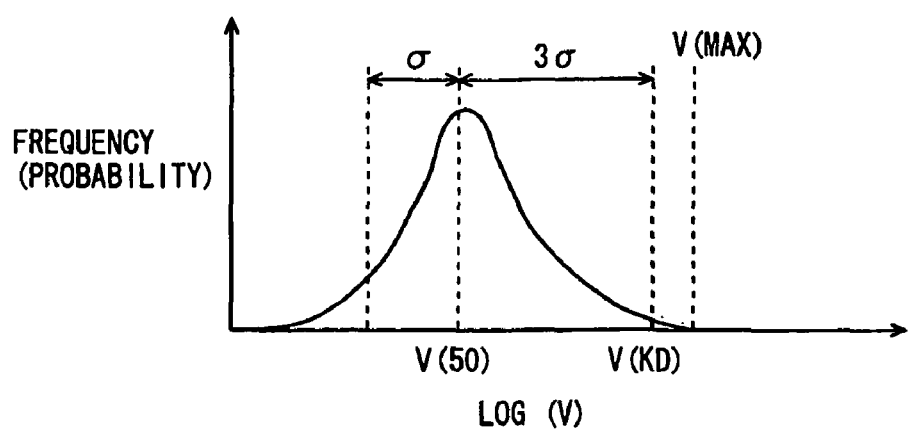
FIG. 10 is a chart (No. 3) showing frequency distribution of magnitude values LOG(V)

If knocking is not occurring in engine 100, the frequency distribution of magnitude values LOG(V) becomes normal distribution as shown in FIG. 9, and maximum value V(MAX) of magnitude value LOG(V) and knock determination level V(KD) agree with each other. On the other hand, by the occurrence of knocking, a greater magnitude V is detected. When a great magnitude value LOG(V) is calculated, as shown in FIG. 10, maximum value V(MAX) becomes greater than knock determination level V(KD).

Figure 11:
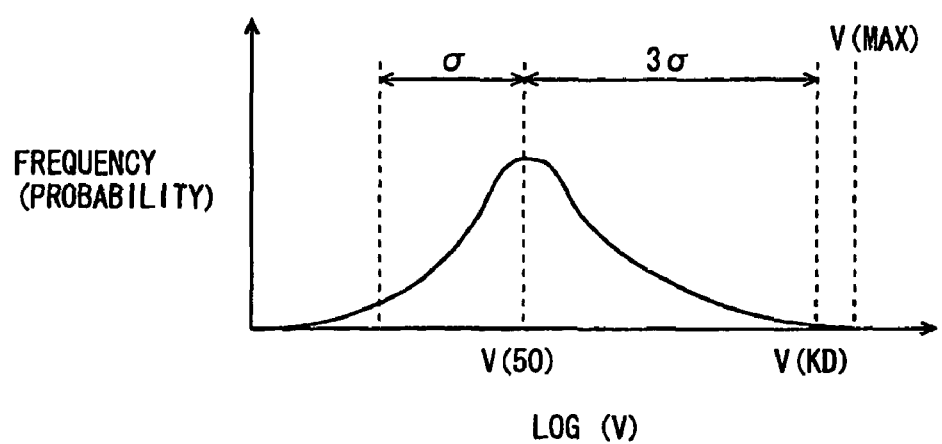
FIG. 11 is a chart (No. 4) showing frequency distribution of magnitude values LOG(V)

When the frequency of occurrence of knocking becomes further higher, as shown in FIG. 11, maximum value V(MAX) becomes further greater. Median value V(50) and standard deviation a in the frequency distribution become greater as maximum value V(MAX) does. As a result, knock determination level V(KD) becomes greater.

A magnitude value LOG(V) smaller than knock determination level V(KD) is not determined as a magnitude value LOG(V) in a cycle in which a knocking has occurred. Therefore, as knock determination level V(KD) becomes greater, the frequency of determining that knocking has not occurred while knocking has actually occurred becomes greater.

Figure 12:
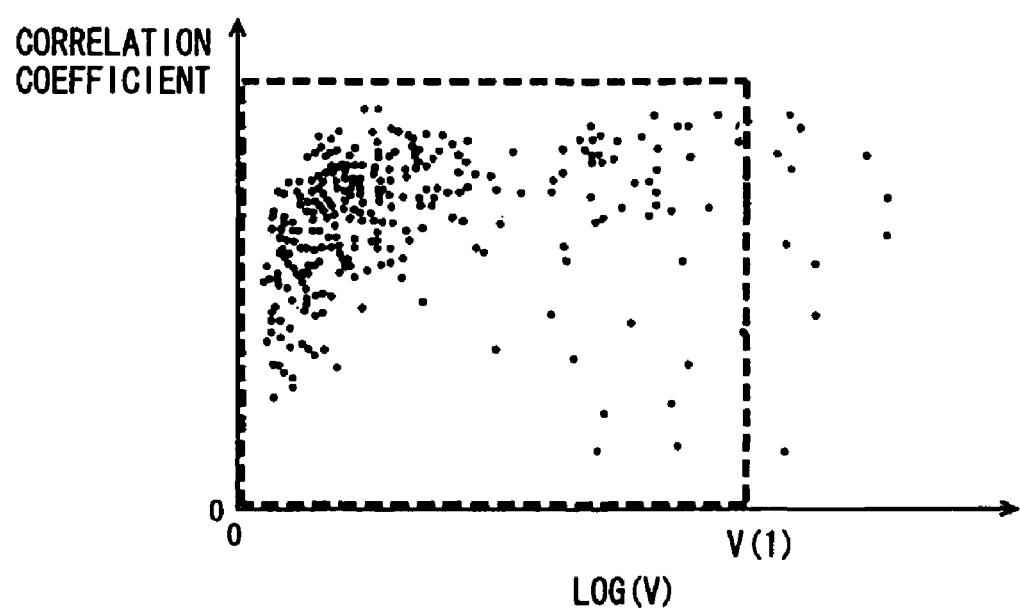
FIG. 12 is a chart showing magnitude values LOG(V) used for forming the frequency distribution of the magnitude values LOG(V)

Therefore, in the embodiment, magnitude values LOG(V) in a range surrounded with a broken line in FIG. 12 are used to exclude magnitude values LOG(V) greater than a threshold value V(1), to thereby obtain median value V(50) and standard deviation σ. FIG. 12 is a chart in which calculated magnitude values LOG(V) are plotted for each correlation coefficient K in a cycle in which the magnitude values LOG(V) are obtained.

Threshold value V(1) is a value obtained by adding, to a median value of frequency distribution of magnitude values LOG(V), the product of a coefficient U(2) (U(2) is a constant and U(2)=3, for example) and a standard deviation of magnitude values LOG(V) equal to or smaller than the median value.

By extracting only magnitude values LOG(V) smaller than threshold value V(1) to calculate median value V(50) and standard deviation a, median value V(50) and standard deviation a do not become excessively great, and become stable values. As a result, knock determination level V(KD) can be suppressed from becoming excessively high. Therefore, the frequency of determining that knocking has not occurred while knocking has actually occurred can be suppressed from becoming high.

The method of extracting magnitude values LOG(V) used for calculating median value V(50) and standard deviation a is not limited to it. For example, out of magnitude values LOG(V) smaller than threshold value V(1) described above, magnitude values LOG(V) calculated in the ignition cycles in which correlation coefficient K is greater than threshold value K(1) may be extracted.

Figure 13:
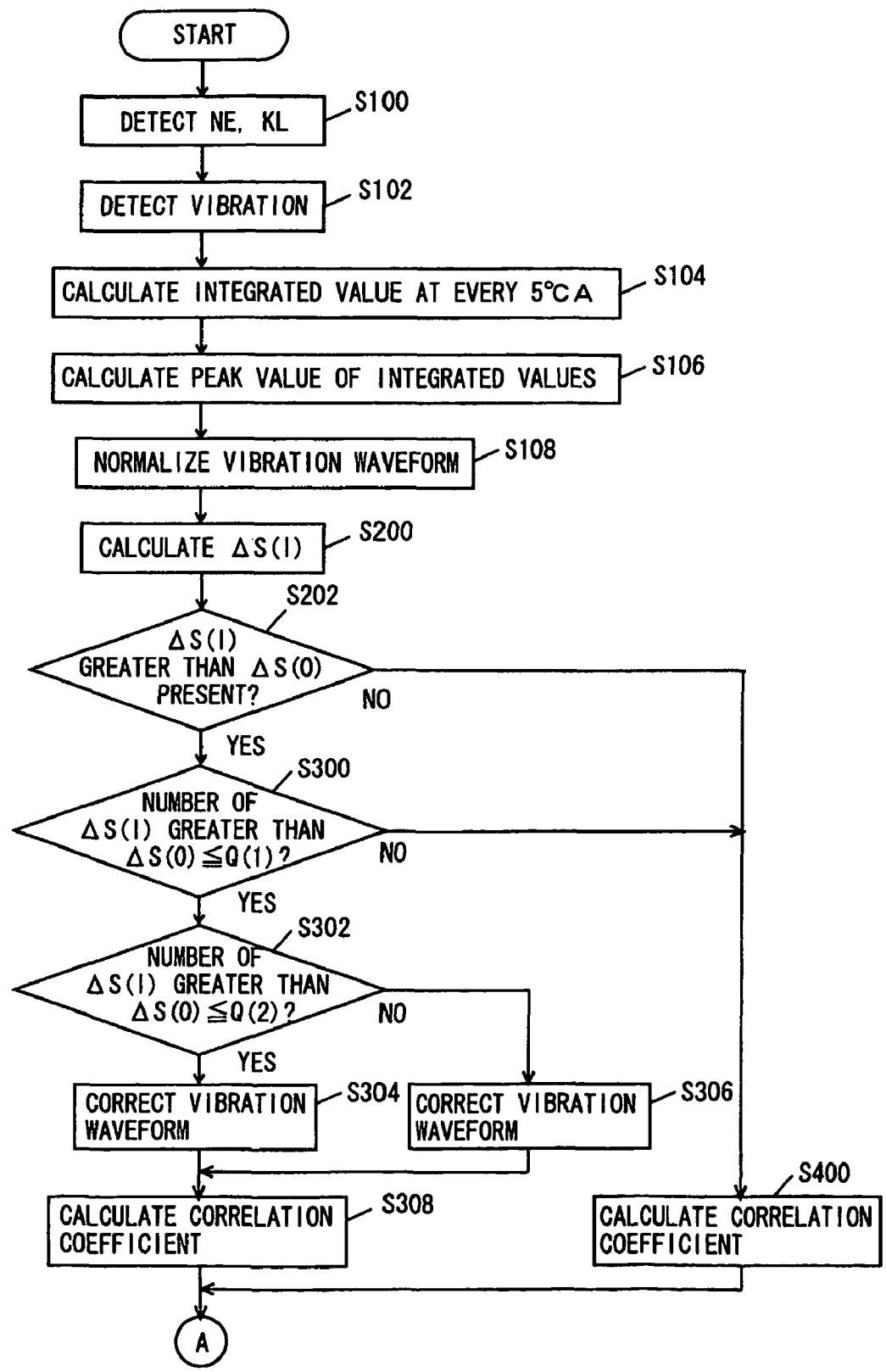
FIG. 13 is a flowchart (No. 1) showing a control structure of the program executed by the engine ECU which is the knocking determination device according to the first embodiment of the present invention.

With reference to FIGS. 13 and 14, a control structure of a program executed by engine ECU 200 which is the knocking determination device according to the embodiment so as to control the ignition timing by determining whether or not knocking has occurred in each ignition cycle will be described.

In step 100 (hereafter "step" will be abbreviated to "S"), engine ECU 200 detects engine speed NE based on a signal sent from crank position sensor 306 and detects intake air amount KL based on a signal sent from air flow meter 314.

In S102, engine ECU 200 detects magnitude of vibration of engine 100 based on a signal sent from knock sensor 300. The magnitude of the vibration is expressed as an output voltage of knock sensor 300. The magnitude of the vibration may be expressed as a value corresponding to the output voltage of knock sensor 300. Detection of the magnitude is carried out between the top dead center and 90° (a crank angle of 90°) in a combustion stroke.

In S104, engine ECU 200 calculates a value (integrated value) obtained by integrating output voltages (values representing magnitudes of vibrations) of knock sensor 300 for every 5° (for 5°) of crank angle. The integrated value is calculated for vibrations in each of first to third frequency bands A to C. Moreover, integrated values in the first to third frequency bands A to C are added to correspond to the crank angles to thereby detect a vibration waveform of engine 100.

In S106, engine ECU 200 calculates the largest integrated value (peak value P) out of integrated values in a synthesized waveform (vibration waveform of engine 100) of the first to third frequency bands A to C.

In S108, engine ECU 200 normalizes the vibration waveform of engine 100. Here, normalization means to express the magnitude of the vibration as a dimensionless number in a range of 0 to 1 by dividing each integrated value by the calculated peak value.

In S200, engine ECU 200 calculates an absolute value $\Delta S(I)$ of the deviation of the vibration waveform after the normalization and the knock waveform model from each other at each crank angle.

In S202, engine ECU 200 determines whether or not $\Delta S(I)$ greater than threshold value $\Delta S(0)$ is present. When $\Delta S(I)$ greater than threshold value $\Delta S(0)$ is present (YES in S202), the processing moves to S300. Otherwise (NO in S202), the processing moves to S400.

In S300, engine ECU 200 determines whether or not the number of $\Delta S(I)$ greater than threshold value $\Delta S(0)$ is equal to or smaller than a predetermined number Q(1). When the number of $\Delta S(I)$ greater than threshold value $\Delta S(0)$ is equal to or smaller than predetermined number Q(I) (YES in S300), the processing moves to S302. Otherwise (NO in S300), the processing moves to S400.

In S302, engine ECU 200 determines whether or not the number of $\Delta S(I)$ greater than threshold value $\Delta S(0)$ is equal to or smaller than a predetermined number Q(2). When the number of $\Delta S(I)$ greater than threshold value $\Delta S(0)$ is equal to or smaller than predetermined, number Q(2) (YES in S302), the processing moves to S304. Otherwise (NO in S302), the processing moves to S306.

In S304, engine ECU 200 corrects the normalized vibration waveform so that the magnitude agrees with the magnitude of the knock waveform model (so that $\Delta S(I)$ is reduced to "0") at crank angles where $\Delta S(I)$ is greater than threshold value $\Delta S(0)$.

In S306, engine ECU 200 corrects the normalized vibration waveform so that the magnitude agrees with the magnitude of the knock waveform model (so that $\Delta S(I)$ is reduced to "0") at Q(3) (Q(3)<Q(1)) of crank angle(s), placing higher priority on crank angles having greater $\Delta S(I)$ among the crank angles where $\Delta S(I)$ is greater than threshold value $\Delta S(0)$.

In S308, engine ECU 200 compares the corrected vibration waveform with the knock waveform model, and calculates correlation coefficient K which is a value related to the deviation of the corrected vibration waveform and the knock waveform model from each other.

In S400, engine ECU 200 compares the normalized vibration waveform (that is not corrected) with the knock waveform model, and calculates correlation coefficient K which is a value related to the deviation of the normalized vibration waveform and the knock waveform model from each other.

In S500, engine ECU 200 calculates knock magnitude N. In S502, engine ECU 200 determines whether correlation coefficient K is greater than a predetermined value and knock magnitude N is greater than determination value V(KX). If correlation coefficient K is greater than a predetermined value and knock magnitude N is greater than determination value V(KX) (YES in S502), the processing moves to S504. Otherwise (NO in S502), the processing moves to S508.

In S504, engine ECU 200 determines that knocking has occurred in engine 100. In S506, engine ECU 200 retards the ignition timing.

In S508, engine ECU 200 determines that knocking has not occurred in engine 100. In S510, engine ECU 200 advances the ignition timing.

Operation of engine ECU 200 which is the knocking determination device according to the embodiment based on the above configuration and flowcharts will be described. In the following description, it is assumed that the above-described predetermined number Q(1) is "3", Q(2) is "2", and Q(3) is "1".

During an operation of engine 100, engine speed NE is detected based on the signal sent from crank position sensor 306 and intake air amount KL is detected based on the signal sent from air flow meter 314 (S100). Moreover, based on the signal sent from knock sensor 300, a magnitude of vibration of engine 100 is detected (S102).

Between the top dead center and 90° in the combustion stroke, the integrated value for every 5° of vibrations in each of the first to third frequency bands A to C is calculated (S104). The calculated integrated values in the first to third frequency bands A to C are added to correspond to the crank angles to thereby detect the above-described vibration waveform of engine 100 as shown in FIG. 4.

As an integrated value for every five degrees is used to detect a vibration waveform, it becomes possible to detect a vibration waveform of which delicate variations are suppressed. Therefore, it becomes easy to compare the detected vibration waveform and the knock waveform model with each other.

Based on the calculated integrated values, peak value P of the integrated values in the synthesized waveform (vibration waveform of engine 100) of the first to third frequency bands A to C is calculated (S106).

The integrated value in the vibration waveform of engine 100 is divided by the calculated peak value P to thereby normalize the vibration waveform (S108). By normalization, the magnitudes of the vibrations in the vibration waveform are expressed as dimensionless numbers in a range of 0 to 1. In this manner, it is possible to compare the detected vibration waveform and the knock waveform model with each other irrespective of the magnitude of the vibration. Therefore, it is unnecessary to store the large number of knock waveform models corresponding to the magnitudes of the vibrations to thereby facilitate forming of the knock waveform model.

With timing at which the magnitude of the vibration becomes a maximum value in the vibration waveform after the normalization and timing at which the magnitude of the vibration becomes a maximum value in the knock waveform model synchronized (see FIG. 6), an absolute value $\Delta S(I)$ of the deviation of the vibration waveform after the normalization and the knock waveform model from each other at each crank angle is calculated (S200).

Here, as shown in FIG. 15, since a vibration waveform that approximates the knock waveform model is obtained, when there is no $\Delta S(I)$ greater than threshold value $\Delta S(0)$ (NO in S202), it is considered that the obtained vibration waveform does not include vibration due to noise other than knocking (vibration due to the actuation of intake valve 116, exhaust valve 118, injector 104 (in particular, an in-cylinder direct injector that directly injects fuel inside a cylinder), pump 120 (in particular, a high-pressure pump that supplies fuel to the injector).

Here, based on the total of calculated ΔS(I), i.e., ΣΔS(I) and value S obtained by integrating the magnitude of the vibration in the knock waveform model by the crank angle, correlation coefficient K is calculated by K=(S−ΣΔS(I))/S (S400).

In this manner, it is possible to convert a degree of agreement between the detected vibration waveform and the knock waveform model into a number to objectively determine the degree. Furthermore, by comparing the vibration waveform and the knock waveform model with each other, it is possible to analyze whether or not the vibration is a vibration at the time of knocking from behavior of the vibration such as an attenuating trend of the vibration.

Furthermore, knock magnitude N is calculated by dividing peak value P by BGL (S500). Thus, it becomes possible to analyze in more detail whether or not vibration of engine 100 is due to knocking.

If correlation coefficient K is greater than a predetermined value and knock magnitude N is greater than a predetermined determination value V(KX) (YES in S502), it is determined that knocking has occurred (S504) and the ignition timing is retarded (S506). As a result, occurrence of the knocking is suppressed. If correlation coefficient K is not greater than a predetermined value or knock magnitude N is not greater than a predetermined determination value (NO in S502), it is determined that knocking has not occurred (S508) and the ignition timing is advanced (S510). Thus, by comparing knock magnitude N and determination value V(KX) with each other, whether or not knocking has occurred is determined for each ignition cycle, and the ignition timing is retarded or advanced.

Meanwhile, it is known that vibration due to noise of intake valve 116, exhaust valve 118, injector 104, pump 120 and the like has such characteristics that is great in magnitude but attenuates more quickly than vibration due to knocking. That is, an occurrence period of vibration due to noise is shorter than that of vibration due to knocking.

Figure 16:
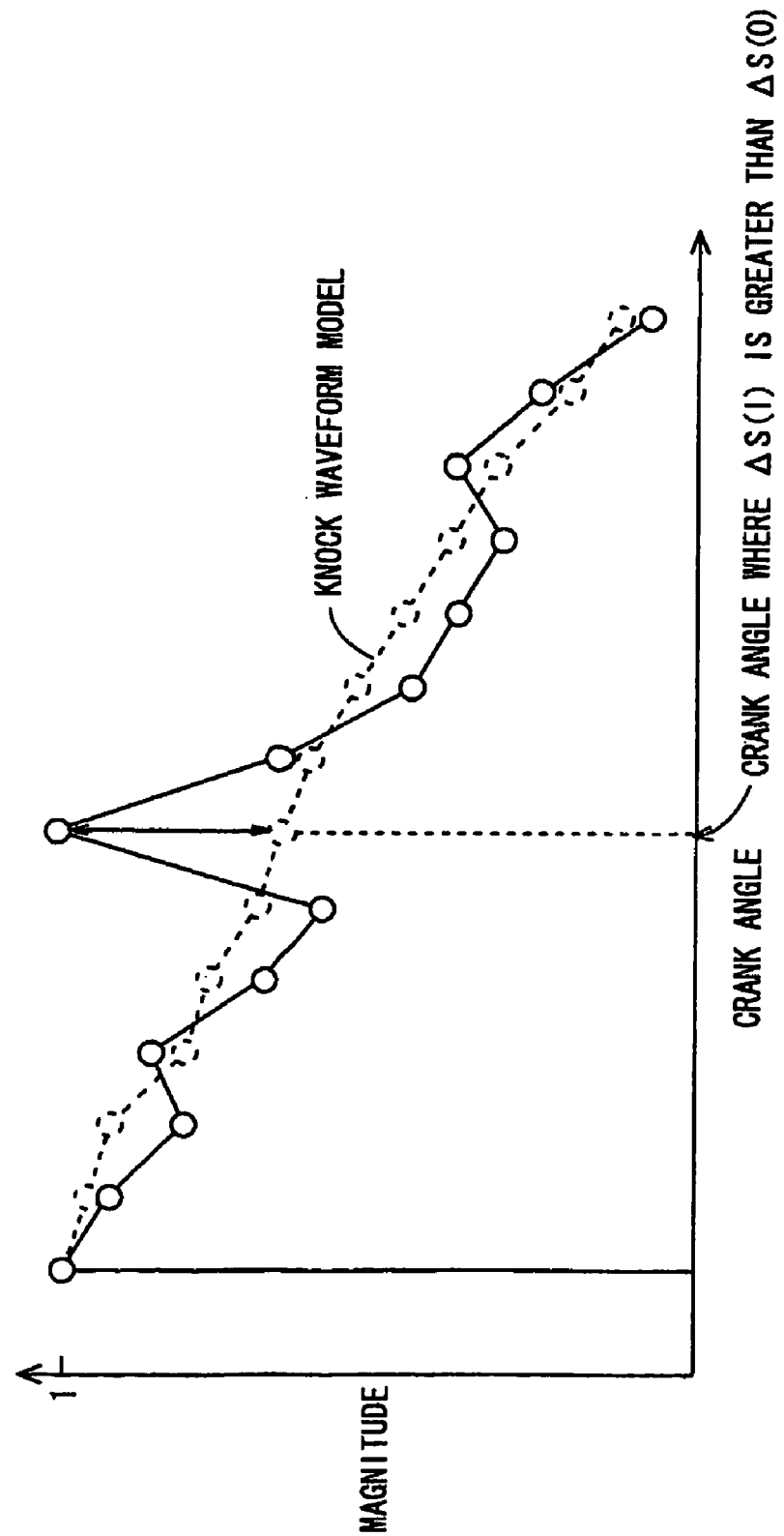
FIG. 16 is a chart (No. 3) for comparing the vibration waveform with the knock waveform model.

Accordingly, as shown in FIG. 16, when a vibration waveform that approximates the knock waveform model is obtained but there is ΔS(I) greater than threshold value ΔS(0) (YES in S202) in the number equal to or smaller than "3" (YES in S300), it is considered that the obtained vibration waveform may include vibration due to noise.

In particular, when the number of ΔS(I) greater than threshold value ΔS(0) is equal to or smaller than "2" (YES in S302), it is considered that it is highly possible for the obtained vibration waveform to include vibration due to noise.

In this case, if the obtained vibration waveform is simply compared with the knock waveform model, an erroneous determination that knocking has not occurred while knocking has occurred may be made because great ΔS(I) is present.

Figure 17:
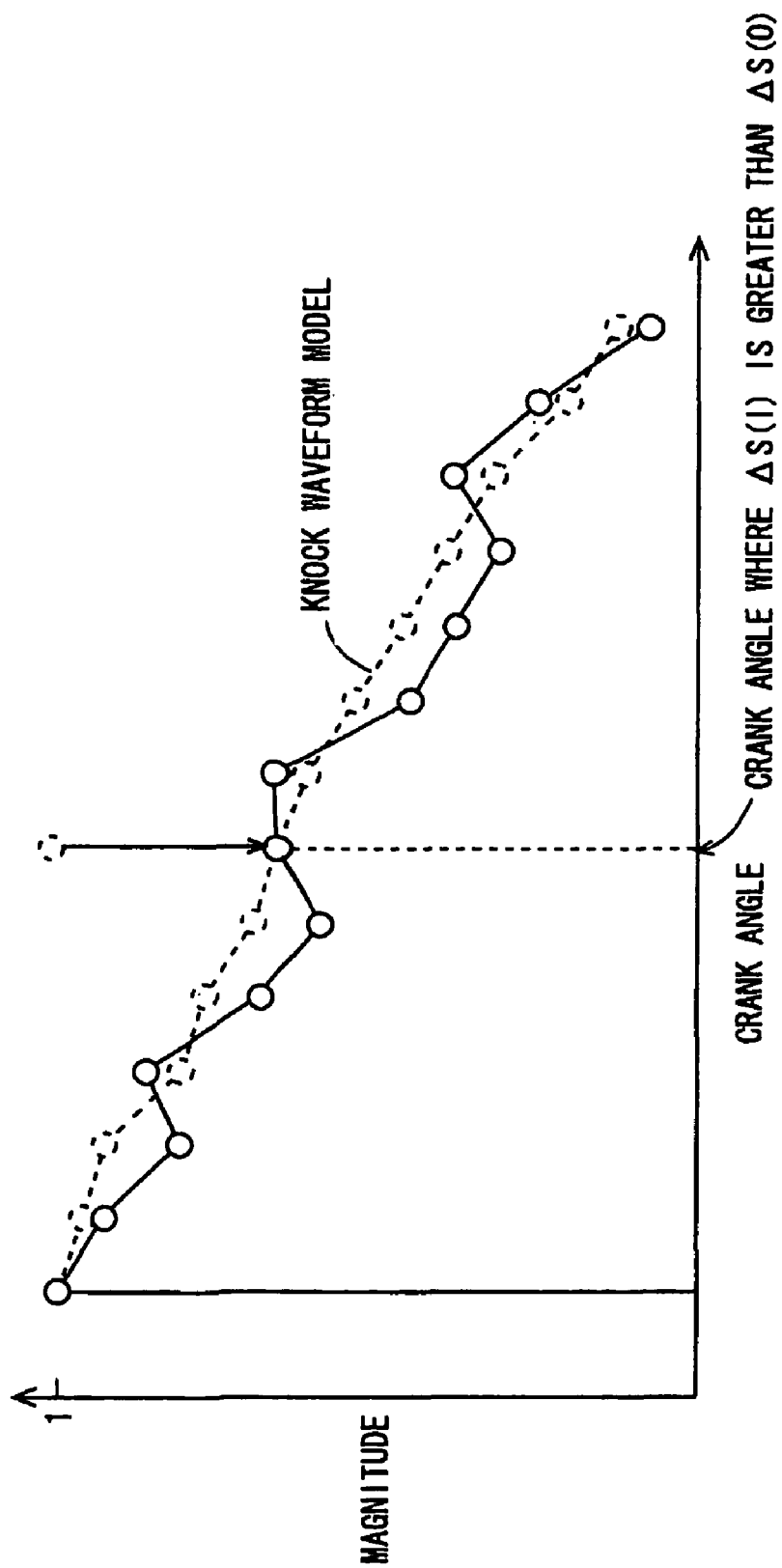
FIG. 17 is a chart (No. 4) for comparing the vibration waveform with the knock waveform model.
Figure 18:
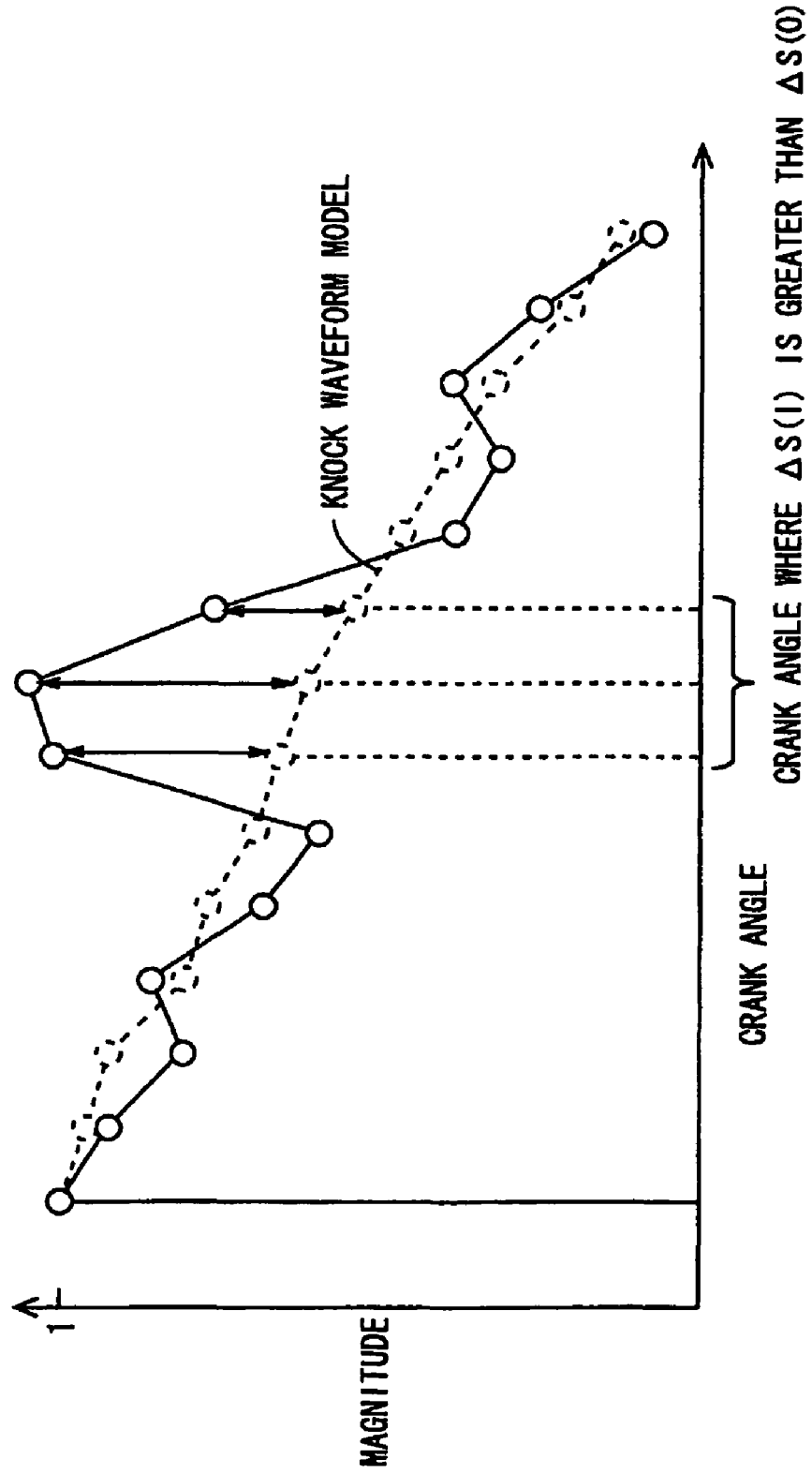
FIG. 18 is a chart (No. 5) for comparing the vibration waveform with the knock waveform model.

Then, as shown in FIG. 17, vibration waveform is corrected so that the magnitude agrees with the magnitude of knock waveform model at crank angles where ΔS(I) is greater than threshold value ΔS(0) (S304). The corrected vibration waveform and the knock waveform model are compared with each other, and correlation coefficient K is calculated (S308).

Thus, the effect of vibration due to noise included in the vibration waveform can be suppressed. As a result, an erroneous determination that knocking has not occurred while knocking has occurred can be suppressed.

On the other hand, when the number of ΔS(I) greater than threshold value ΔS(0) is equal to or smaller than "3" (YES in S300) and more than "2" (NO in S302), it is possible for the obtained vibration waveform to include or not to include vibration due to noise.

Figure 19:
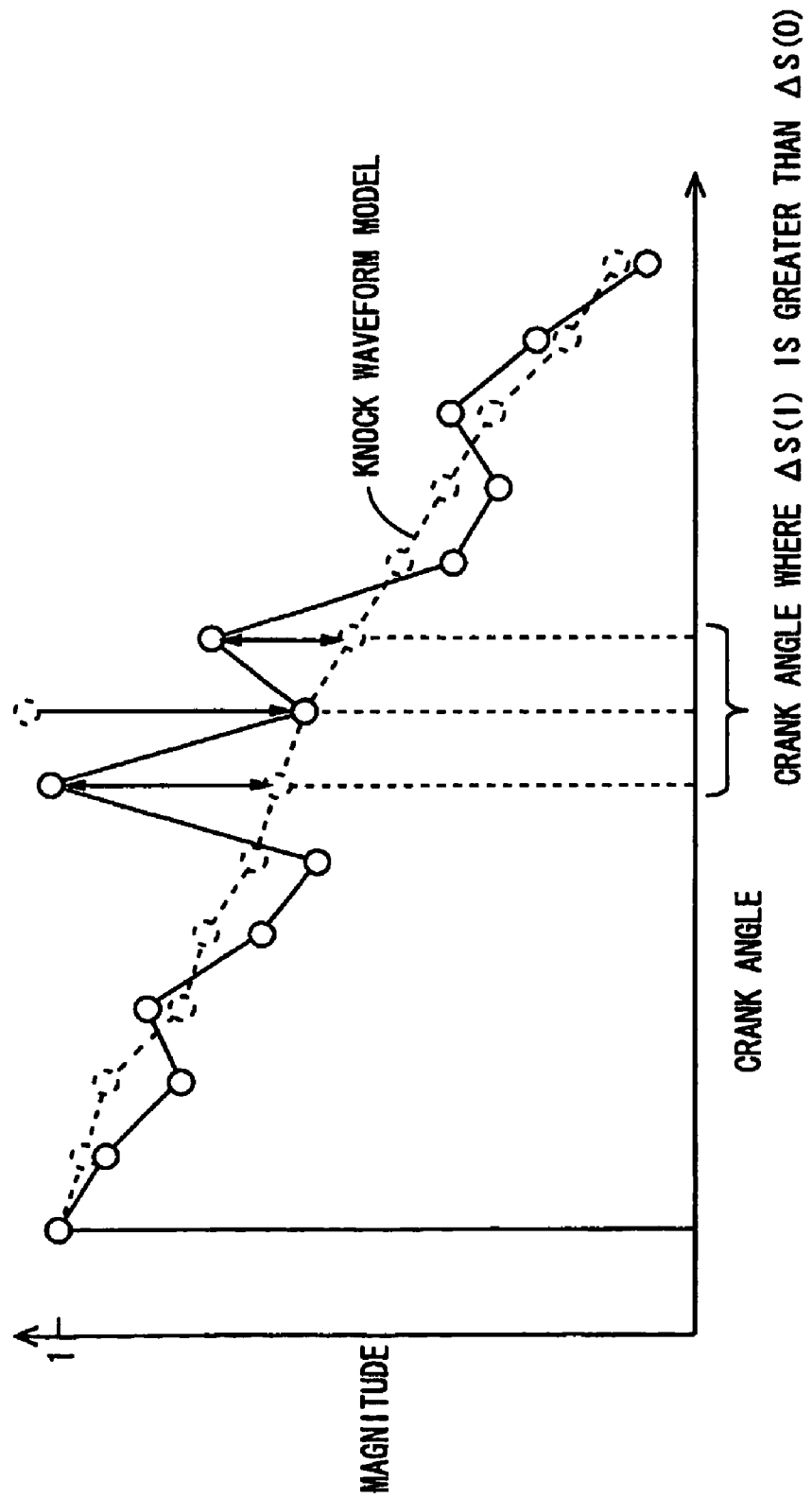
FIG. 19 is a chart (No. 6) for comparing the vibration waveform with the knock waveform model.

If the vibration waveform is corrected in such a case, an erroneous determination that knocking has occurred while knocking has not occurred can be made. Accordingly, in this case, as shown in FIG. 19, vibration waveform is corrected so that the magnitude agrees with the magnitude of knock waveform model at "one" crank angle, placing higher priority on crank angles having greater ΔS(I) among the crank angles where ΔS(I) is greater than threshold value ΔS(0). Thus, undue correction to the vibration waveform can be suppressed.

Thus corrected vibration waveform and the knock waveform model are compared with each other, and correlation coefficient K is calculated (S308). As a result, an erroneous determination that knocking has occurred while knocking has not occurred can be suppressed.

Figure 20:
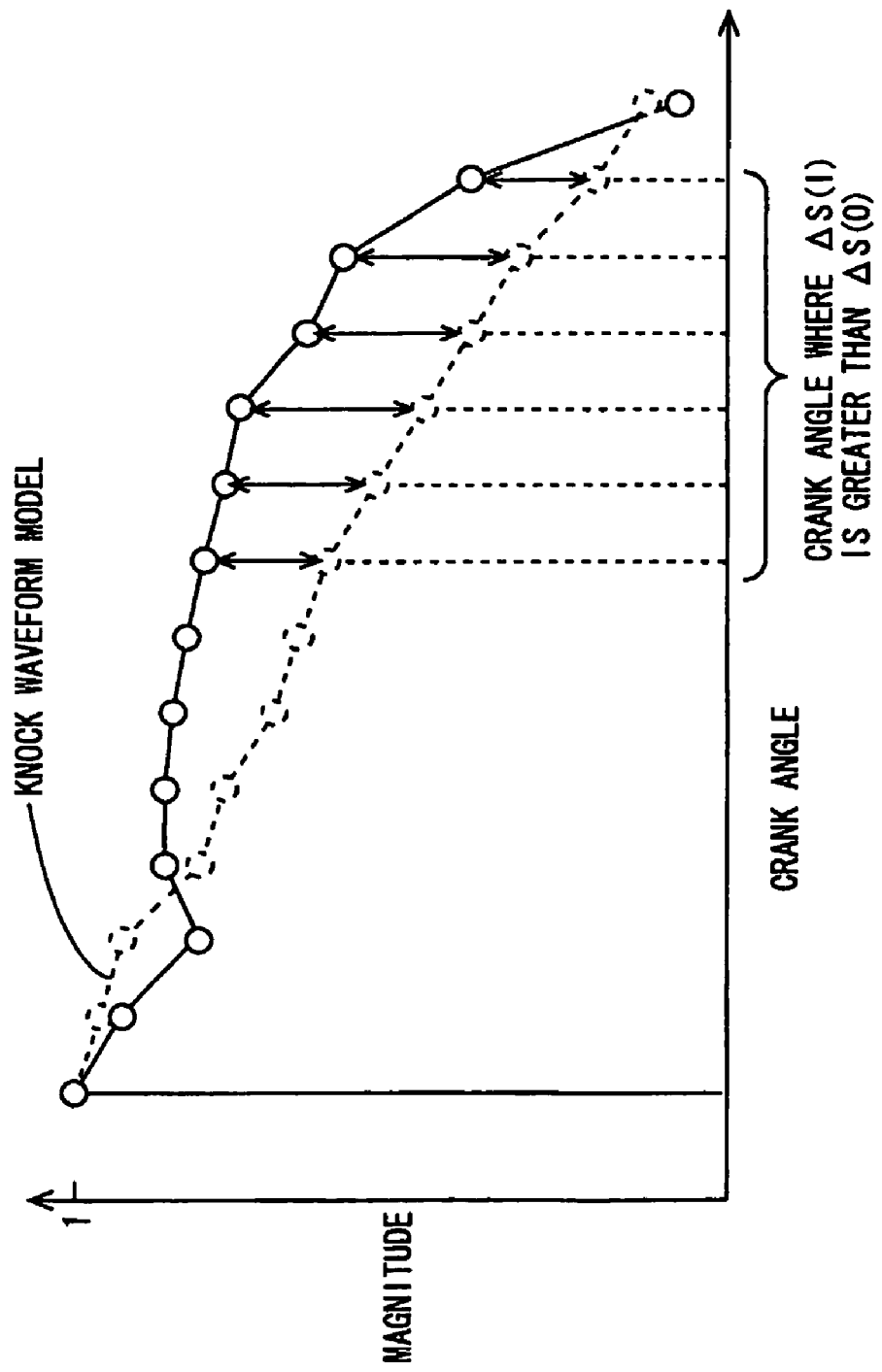
FIG. 20 is a chart (No. 7) for comparing the vibration waveform with the knock waveform model.

Here, as shown in FIG. 20, since a vibration waveform that is greatly different from the knock waveform model is obtained, when there is ΔS(I) greater than threshold value ΔS(0) (YES in S202) and the number is "6" (more than "3") (NO in S300), it is highly possible for the obtained vibration waveform not to include vibration due to noise.

Accordingly, without correcting the vibration waveform, the obtained vibration waveform and the knock waveform model are compared with each other and correlation coefficient K is calculated (S400). As a result, an erroneous determination that knocking has occurred while knocking has not occurred can be suppressed.

As described above, with the engine ECU that is the knocking determination device according to the embodiment, ΔS(I) that is the difference in the magnitude of vibration between the vibration waveform and the knock waveform model is calculated at each crank angle. When ΔS(I) greater than threshold value ΔS(0) is present and the number thereof is equal to or smaller than Q(1), the vibration waveform is corrected so that the magnitude agrees with the magnitude of the knock waveform model at crank angles where ΔS(I) is greater than threshold value ΔS(0). Thus, the effect of the vibration due to noise included in the vibration waveform can be suppressed. The vibration waveform corrected in this manner and the knock waveform model are compared with each other to determine whether or not knocking is present. Thus, an erroneous determination that knocking has not occurred while knocking has occurred can be suppressed. On the other hand, when the number of ΔS(I) greater than threshold value ΔS(0) is greater than Q(1), without correcting the vibration waveform, the obtained vibration waveform and the knock waveform model are compared with each other to calculate correlation coefficient K. Thus, an erroneous determination that knocking has occurred while knocking has not occurred can be suppressed. As a result, whether knocking is present or absent can precisely be determined.

It is noted that, while in the embodiment the vibration waveform is corrected placing higher priority on the crank angles where ΔS(I) is greater, it is possible to correct the vibration waveform at Q(3) crank angle(s) placing higher priority on the crank angles where the magnitude in the knock waveform model is greater.

Furthermore, it is also possible to correct the vibration waveform placing higher priority on the crank angles where ΔS(I) is smaller. This can suppress the effect of the correction.

Although the present invention has been described and illustrated in detail, it is clearly understood that the same is by way of illustration and example only and is not to be taken by way of limitation, the spirit and scope of the present invention being limited only by the terms of the appended claims.

The invention claimed is:

1. A device for determining knocking of an internal combustion engine, comprising:
   a crank position sensor detecting a crank angle of said internal combustion engine;
   a knock sensor detecting magnitude of vibration of said internal combustion engine to correspond to the crank angle; and
   an operation unit connected to said crank position sensor and said knock sensor, wherein
   said operation unit detects a waveform of vibration in a predetermined interval of the crank angle based on the magnitude of vibration of said internal combustion engine,
   said operation unit calculates for each predetermined crank angle a difference in magnitude of vibration between the detected waveform and a waveform model predetermined as a reference waveform of vibration of said internal combustion engine,
   when a difference in magnitude greater than a predetermined value is present and number of said difference in magnitude greater than the predetermined value is equal to or smaller than a predetermined number, said operation unit corrects the detected waveform,
   when the difference in magnitude greater than the predetermined value is present and the number of said difference in magnitude greater than the predetermined value is equal to or smaller than the predetermined number, said operation unit determines whether or not knocking has occurred in said internal combustion engine based on a result of comparison between the corrected waveform and the waveform model, and
   when the difference in magnitude greater than the predetermined value is present and the number of the difference in magnitude greater than the predetermined value is greater than the predetermined number, said operation unit determines whether or not knocking has occurred in said internal combustion engine based on a result of comparison between the detected waveform and the waveform model.

2. The device for determining knocking of the internal combustion engine according to claim 1, wherein
   said operation unit corrects the detected waveform so that at least one of said differences in magnitude greater than the predetermined value is reduced.

3. The device for determining knocking of the internal combustion engine according to claim 2, wherein
   said operation unit corrects the detected waveform so that, in said differences in magnitude greater than the predetermined value, a difference in magnitude that is smaller in number than said differences in magnitude greater than the predetermined value is reduced.

4. The device for determining knocking of the internal combustion engine according to claim 3, wherein
   said operation unit further selects based on the difference in magnitude a crank angle at which the difference in magnitude is to be reduced, out of crank angles at which said difference in magnitude is greater than the predetermined value, and
   said operation unit corrects the detected waveform so that, in said differences in magnitude greater than the predetermined value, a difference in magnitude at the selected crank angle is reduced.

5. The device for determining knocking of the internal combustion engine according to claim 4, wherein
   said operation unit selects the crank angle placing higher priority on a crank angle at which the difference in magnitude is greater.

6. A method of determining knocking of the internal combustion engine, comprising the steps of:
   detecting a crank angle of said internal combustion engine;
   detecting magnitude of vibration of said internal combustion engine to correspond to the crank angle;
   detecting a waveform of vibration in a predetermined interval of the crank angle based on the magnitude of vibration of said internal combustion engine;
   calculating for each predetermined crank angle a difference in magnitude of vibration between the detected waveform and a waveform model predetermined as a reference waveform of vibration of said internal combustion engine;
   when a difference in magnitude greater than a predetermined value is present and number of said difference in magnitude greater than the predetermined value is equal to or smaller than a predetermined number, correcting the detected waveform;
   when the difference in magnitude greater than the predetermined value is present and the number of said difference in magnitude greater than the predetermined value is equal to or smaller than the predetermined number, determining whether or not knocking has occurred in said internal combustion engine based on a result of comparison between the corrected waveform and the waveform model; and
   when the difference in magnitude greater than the predetermined value is present and the number of the difference in magnitude greater than the predetermined value is greater than the predetermined number, determining whether or not knocking has occurred in said internal combustion engine based on a result of comparison between the detected waveform and the waveform model.

7. The method of determining knocking of the internal combustion engine according to claim 6, wherein
   said step of correcting the detected waveform includes a step of correcting the detected waveform so that at least one of said differences in magnitude greater than the predetermined value is reduced.

8. The method of determining knocking of the internal combustion engine according to claim 7, wherein
   said step of correcting the detected waveform includes a step of correcting the detected waveform so that, in said differences in magnitude greater than the predetermined value, a difference in magnitude that is smaller in number than said differences in magnitude greater than the predetermined value is reduced.

9. The method of determining knocking of the internal combustion engine according to claim 8, further comprising a step of
   selecting based on the difference in magnitude a crank angle at which the difference in magnitude is to be reduced, out of crank angles at which said difference in magnitude is greater than the predetermined value, wherein
   said step of correcting the detected waveform includes a step of correcting the detected waveform so that, in said differences in magnitude greater than the predetermined value, a difference in magnitude at the selected crank angle is reduced.

10. The method of determining knocking of the internal combustion engine according to claim 9, wherein said step of selecting the crank angle at which the difference in magnitude is to be reduced includes a step of selecting the crank angle placing higher priority on a crank angle at which the difference in magnitude is greater.

11. A device for determining knocking of an internal combustion engine, comprising:

means for detecting a crank angle of said internal combustion engine;

means for detecting magnitude of vibration of said internal combustion engine to correspond to the crank angle;

means for detecting a waveform of vibration in a predetermined interval of the crank angle based on the magnitude of vibration of said internal combustion engine;

means for calculating for each predetermined crank angle a difference in magnitude of vibration between the detected waveform and a waveform model predetermined as a reference waveform of vibration of said internal combustion engine;

correcting means for, when a difference in magnitude greater than a predetermined value is present and number of said difference in magnitude greater than the predetermined value is equal to or smaller than a predetermined number, correcting the detected waveform;

means for, when the difference in magnitude greater than the predetermined value is present and the number of said difference in magnitude greater than the predetermined value is equal to or smaller than the predetermined number, determining whether or not knocking has occurred in said internal combustion engine based on a result of comparison between the corrected waveform and the waveform model; and means for, when the difference in magnitude greater than the predetermined value is present and the number of the difference in magnitude greater than the predetermined value is greater than the predetermined number, determining whether or not knocking has occurred in said internal combustion engine based on a result of comparison between the detected waveform and the waveform model.

12. The device for determining knocking of the internal combustion engine according to claim 11, wherein said correcting means includes means for correcting the detected waveform so that at least one of said differences in magnitude greater than the predetermined value is reduced.

13. The device for determining knocking of the internal combustion engine according to claim 12, wherein said correcting means includes means for correcting the detected waveform so that, in said differences in magnitude greater than the predetermined value, a difference in magnitude that is smaller in number than said differences in magnitude greater than the predetermined value is reduced.

14. The device for determining knocking of the internal combustion engine according to claim 13, further comprising selecting means for selecting based on the difference in magnitude a crank angle at which the difference in magnitude is to be reduced, out of crank angles at which said difference in magnitude is greater than the predetermined value, wherein said correcting means includes means for correcting the detected waveform so that, in said differences in magnitude greater than the predetermined value, a difference in magnitude at the selected crank angle is reduced.

15. The device for determining knocking of the internal combustion engine according to claim 14, wherein said selecting means includes means for selecting the crank angle placing higher priority on a crank angle at which the difference in magnitude is greater.

* * * * *